(12) United States Patent
Lucey

(10) Patent No.: US 10,739,197 B2
(45) Date of Patent: *Aug. 11, 2020

(54) FABRY-PEROT FOURIER TRANSFORM SPECTROMETER

(71) Applicant: University of Hawaii, Honolulu, HI (US)

(72) Inventor: Paul Lucey, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,087

(22) Filed: May 26, 2017

(65) Prior Publication Data
US 2018/0080824 A1     Mar. 22, 2018

Related U.S. Application Data

(63) Continuation of application No. 12/958,312, filed on Dec. 1, 2010, now Pat. No. 9,664,563.
(Continued)

(51) Int. Cl.
*G01J 3/26* (2006.01)
*G01J 3/453* (2006.01)
*G01J 3/14* (2006.01)

(52) U.S. Cl.
CPC . *G01J 3/26* (2013.01); *G01J 3/14* (2013.01); *G01J 3/4531* (2013.01)

(58) Field of Classification Search
CPC ............... G01J 3/26; G01J 3/14; G01J 3/4531
(Continued)

(56) References Cited

U.S. PATENT DOCUMENTS

| 4,076,422 A | 2/1978 | Kohno |
| 4,310,245 A * | 1/1982 | Pritchard ............. G01B 9/0209 356/497 |

(Continued)

FOREIGN PATENT DOCUMENTS

| JP | 57-044823 | 3/1982 |
| JP | 03-015727 | 1/1991 |

(Continued)

OTHER PUBLICATIONS

Caulfield, H.J., "Spectroscopy," in Handbook of Optical Holography (Academic, 1979), pp. 587-594.
(Continued)

*Primary Examiner* — Hina F Ayub
(74) *Attorney, Agent, or Firm* — Knobbe, Martens, Olson & Bear, LLP

(57) ABSTRACT

A spatial Fourier transform spectrometer is disclosed. The Fourier transform spectrometer includes a Fabry-Perot interferometer with first and second optical surfaces. The gap between the first and second optical surfaces spatially varies in a direction that is orthogonal to the optical axis of the Fourier transform spectrometer. The Fabry-Perot interferometer creates an interference pattern from input light. An image of the interference pattern is captured by a detector, which is communicatively coupled to a processor. The processor is configured to process the interference pattern image to determine information about the spectral content of the input light.

24 Claims, 18 Drawing Sheets

Related U.S. Application Data

(60) Provisional application No. 61/345,549, filed on May 17, 2010, provisional application No. 61/283,519, filed on Dec. 2, 2009.

(58) Field of Classification Search
USPC .......................................................... 356/454
See application file for complete search history.

(56) References Cited

U.S. PATENT DOCUMENTS

| | | |
|---|---|---|
| 4,957,371 A | 9/1990 | Pellicori et al. |
| 5,539,517 A | 7/1996 | Cabib et al. |
| 5,777,736 A | 7/1998 | Horton |
| 5,835,214 A | 11/1998 | Cabib et al. |
| 6,016,199 A | 1/2000 | Newton |
| 6,088,099 A | 7/2000 | Cabib et al. |
| 6,381,022 B1 | 4/2002 | Zavracky |
| 6,870,629 B1 | 3/2005 | Vogel et al. |
| 6,985,233 B2 | 1/2006 | Tuschel et al. |
| 7,202,955 B2 | 4/2007 | Te Kolste et al. |
| 7,262,839 B2 | 8/2007 | Treado et al. |
| 7,355,780 B2 | 4/2008 | Chui et al. |
| 2004/0239939 A1 | 12/2004 | Guerineau et al. |
| 2005/0068541 A1 | 3/2005 | Gunning et al. |
| 2005/0270544 A1 | 12/2005 | Hsieh et al. |
| 2006/0239608 A1 | 10/2006 | Akashi |
| 2007/0153288 A1 | 7/2007 | Wang et al. |
| 2007/0273888 A1 | 11/2007 | Kamihara |
| 2008/0158568 A1 | 7/2008 | Claydon et al. |
| 2008/0180691 A1 | 7/2008 | Hays et al. |
| 2008/0186503 A1 | 8/2008 | Kiesel et al. |
| 2008/0252897 A1 | 10/2008 | Arnvidarson et al. |
| 2009/0296104 A1* | 12/2009 | Shiell .................... G01J 1/4257 356/519 |
| 2009/0316159 A1 | 12/2009 | Scott |
| 2011/0032529 A1 | 2/2011 | Wan et al. |
| 2011/0228279 A1 | 9/2011 | Lucey |

FOREIGN PATENT DOCUMENTS

| | | |
|---|---|---|
| JP | 2008-232843 | 10/2008 |
| JP | 2013-513112 | 4/2013 |
| WO | WO2011/069013 A1 | 6/2011 |

OTHER PUBLICATIONS

Fabry et al., "On a New Form of Interferometer," Astrophys. J., 13, 265 (1901).
Figueiredo et al., "Gradient Projection for Sparse Reconstruction: Application to Compressed Sensing and Other Inverse Problems", IEEE Journal of Selected Topics in Signal Processing, 1, pp. 586-597, (2007).
Gillard et al., "Fundamental performances of a microstationary Fourier transform spectrometer", Proc. SPIE, vol. 7716 (2010).
Hecht, "Section 9.4.1 Dielectric Films—Double-Beam Interference", Optics, Fourth Edition, pp. 400-407 (2002).
Horton,R. F., "Optical Design for a High Etendue imaging Fourier Transform Spectrometer," 11 in Proc. SPIE 2819, 300-315 (1996).
Kyle, T. G., "Temperature soundings with partially scanned interferograms," Appl. Optics, 16, 326-333 (1977).
Le Coarer et al., "Wavelength-Scale Stationary-Wave Integrated Fourier-Transform Spectrometry", Nature Photonics 1, pp. 473-478 (2007).
Lucey et al., "High-performance Sagnac interferometer Using Cooled Detectors for Infrared LWIR Hyperspectral Imaging," Proc. of SPIE 6546, 654604-1, (2007).
Lucey et al., "A Fabry-Perot Interferometer with a Spatially Variable Resonance Gap Employed as a Fourier Transform Spectrometer", Proc. of SPIE, vol. 8048, 2011.
Lucey et al., "High-performance Sagnac interferometer using uncooled detectors for infrared hyperspectral applications," Proc. SPIE 6565 (2007).
Lucey et al., "Mini-SMIFTS: an uncooled LWIR hyperspectral sensor," Proc. SPIE vol. 5159, 275-282 (2003).
Lucey et al., "Performance of a long-wave infrared hyperspectral imager using a Sagnac interferometer and an uncooled microbolometer array," Appl. Optics, 47, 28, F107-F113 (2008).
Lucey et al., "SMIFTS: A cryogenically-cooled spatially-modulated imaging infrared interferometer spectrometer," in Proc. SPIE 1937, 130-141 (1993).
Minnett et al., "The High Efficiency Hyperspectral Imager—a new instrument for measurements of the Arctic surface," presented at the Eighth Conference on Polar Meteorology and Oceanography, American Meteorological Society, poster presentation P1 .3, Jan. 11, 2005.
Okamoto et al., "A Photodiode Array Fourier Transform Spectrometer Based on a Birefringent Interferometer," Appl. Spectrosc., vol. 40, No. 5, pp. 691-695 (1986).
Okamoto et al., "Fourier transform spectrometer with a selfscanning photodiode array," Appl. Opt. vol. 23, No. 2, 269 (1984).
Griffiths, et al., 1986, Fourier Transform Infrared Spectrometry (Wiley, 1986).
Rafert et al., "Hyperspectral imaging Fourier transform spectrometers for astronomical and remote sensing observations," Proc. SPIE 2198, 338-349 (1994).
S. Rommelu'ere et al., "Infrared Focal Plane Array with a Built-In Stationary Fourier-Transform Spectrometer: Basic Concepts", Opt. Lett. 33, pp. 1062-1064 (2008).
S. Rommelu'ere et al., "Single-Scan Extraction of Two-Dimensional Parameters of Infrared Focal Plane Arrays Utilizing a Fourier Transform Spectrometer", Appl. Opt. 46, pp. 1379-1384 (2007).
Smith et al., "Digital array scanned interferometer: sensor and results," Appl. Optics, vol. 35, No. 16, pp. 2902-2909 (1996).
Smith et al., "Digital array scanned interferometers for Astronomy," Exp. Astron. 1, pp. 389-504 (1991).
Yarbrough, et al., "MightySat 11.1 hyperspectral imager: summary of on-orbit performance", Proc. of SPIE vol. 4480, pp. 186-197 (2002).
International Search Report and Written Opinion issued in corresponding PCT Application No. PCT/US2010/58794, dated Feb. 17, 2011, 13 pages.
Office Action issued in corresponding Australian Application No. 2010325963, dated Feb. 28, 2014, 3 pages.
Office Action issued in corresponding Japanese Application No. 2012-542201, dated Jun. 24, 2014, 6 pages.
Vargas-Rodriguez, E. and Rutt, H.N., Analytical method to find the optimal parameters for gas detectors based on correlation spectroscopy using a Fabry-Perot interferometer, Appl. Opt., Optical Society of America, Jul. 20, 2007, vol. 46, No. 21, pp. 4625-4632.
Office Action issued in corresponding Japanese Application No. 2012-542201, dated Feb. 23, 2016, 9 pages.
Li-Jin Chen et al., "A Simple Terahertz Spectrometer based on a Low-Reflective Fabry-Perot Interferometer using Fourier Transform Spectroscopy", Optics Express, OSA, May 1, 2006, vol. 14, No. 9, pp. 3840-3846.
Marco Pisani et al. "Compact imaging spectrometer combining Fourier transform spectroscopy with a Fabry-Perot interferometer" Optics Express, vol. 17, No. 1 Opp. 8319-8331.

* cited by examiner

US 10,739,197 B2

FABRY-PEROT FOURIER TRANSFORM SPECTROMETER

CROSS-REFERENCE TO RELATED APPLICATIONS

This application is a continuation of U.S. patent application Ser. No. 12/958,312, filed Dec. 1, 2010, and entitled "FABRY-PEROT FOURIER TRANSFORM SPECTROMETER," which claims priority to the following United States provisional patent applications: U.S. Provisional Patent Application No. 61/283,519, filed Dec. 2, 2009, and entitled "SPATIALLY VARIABLE ETALON FOR SPECTROSCOPY AND SPECTRAL IMAGING"; and U.S. Provisional Patent Application No. 61/345,549, filed May 17, 2010, and entitled "A FABRY-PEROT INTERFEROMETER WITH A SPATIALLY VARIABLE RESONANCE GAP EMPLOYED AS A FOURIER TRANSFORM SPECTROMETER." Each of the foregoing patent applications is hereby incorporated herein by reference in its entirety to be considered part of this specification.

BACKGROUND OF THE INVENTION

Field of the Invention

The invention relates to the field of spectroscopy including, for example, Fourier transform spectroscopy.

Description of the Related Art

Fourier transform spectroscopy is a technique that can be used for obtaining information about the spectral content of light from a source. Many Fourier transform spectrometers (FTS) employ a Michelson interferometer and measure the spectrum of light that is encoded in a time-varying signal that results from the interaction of the input light with the interferometer. In a Michelson FTS the interference pattern is sampled in time. The Michelson FTS uses a moving mirror that causes an input beam, which is split into two arms and then recombined, to experience a time varying optical path difference (OPD) between the two arms. Illuminated by monochromatic light, the detector response to this time varying OPD is a sinusoidal signal whose period is a function of the rate of change of the OPD and the wavelength of the incident light. The wavelength of the incident light is recovered from the sampled signal by precise knowledge of the rate of change of the OPD, usually using a reference laser signal. Illumination by multiple wavelengths produces a resultant pattern that is additive; the intensities of the individual wavelengths are recovered using the Fourier transform after appropriate preprocessing. The transformation from sampled interference pattern (i.e., the interferogram) to spectrum is well-established.

Another type of FTS is the spatial FTS, where the spectrum of the input light is encoded in a spatial pattern sampled by a detector array. A spatial FTS may use optics to produce a gradient in OPD across a detector array, for example, by slight deviations of mirrors or beamsplitters relative to perfect symmetry. The interaction of illuminating light with this gradient in OPD produces an interference pattern that is sampled by the array. The interferogram is calibrated in wavelength (i.e., the slope of the OPD is determined) using a known monochromatic source (e.g., light transmitted through an interference filter). Once sampled and corrected for non-uniformities in response of the detector array elements, data processing can be similar to the Michelson FTS data processing.

SUMMARY OF THE INVENTION

In some embodiments, a Fourier transform spectrometer comprises: a Fabry-Perot interferometer to create an interference pattern using input light; a detector positioned with respect to the Fabry-Perot interferometer to capture an image of the interference pattern, the detector comprising a plurality of detection elements, and defining an optical axis that is orthogonal to the detector; and a processor that is communicatively coupled to the detector, the processor being configured to process the interference pattern image to determine information about the spectral content of the light, wherein the Fabry-Perot interferometer comprises first and second optical surfaces that are partially transmissive and partially reflective to the light, the first and second optical surfaces defining a resonant cavity therebetween, the distance between the first and second optical surfaces being spatially variable in a first transverse direction that is orthogonal to the optical axis.

In some embodiments, a method of determining the spectral content of input light comprises: creating an interference pattern from input light using a Fabry-Perot interferometer; creating an interference pattern image using a detector that is positioned with respect to the Fabry-Perot interferometer to capture an image of the interference pattern, the detector comprising a plurality of detection elements, and defining an optical axis that is orthogonal to the detector; and processing the interference pattern image using a processor to determine information about the spectral content of the light, wherein the Fabry-Perot interferometer comprising first and second optical surfaces that are partially transmissive and partially reflective to the light, the first and second optical surfaces defining a resonant cavity therebetween, the distance between the first and second optical surfaces being spatially variable in a first transverse direction that is orthogonal to the optical axis, and wherein the interference pattern image is captured during a period of time in which characteristics of the Fabry-Perot interferometer are not intentionally varied.

BRIEF DESCRIPTION OF THE DRAWINGS

Certain aspects, advantages, and features of the invention are described herein. It is to be understood, however, that not necessarily all such aspects, advantages, and features are necessarily included or achieved in every embodiment of the invention. Thus, the invention may be embodied or carried out in a manner that includes or achieves one aspect, advantage, or feature, or group thereof, without necessarily including or achieving other aspects, advantages, or features as may be taught or suggested herein. Certain embodiments are illustrated in the accompanying drawings, which are for illustrative purposes only.

DETAILED DESCRIPTION OF THE PREFERRED EMBODIMENT

The following disclosure describes embodiments of a type of spatial FTS that uses a Fabry-Perot interferometer with a spatially varying gap between its reflective layers to produce interference, or fringe, patterns that can be processed to obtain information regarding the spectral content of light. In some embodiments, the gap varies in a direction that is orthogonal to the optical axis of the FTS. This spatially varying gap can produce a gradient in optical path length at a detector. This gradient in optical path length produces an interference pattern that, in some embodiments, can be analyzed with conventional FTS data processing techniques. The disclosure also describes the impact of the non-sinusoidal periodic spatial interference pattern that is produced by some embodiments of the FTS, as well as a choice of layer reflectances to increase or maximize sensitivity, and the effect of using the FTS with input light that has a range of incidence angles upon the interferometer.

Figure 1:
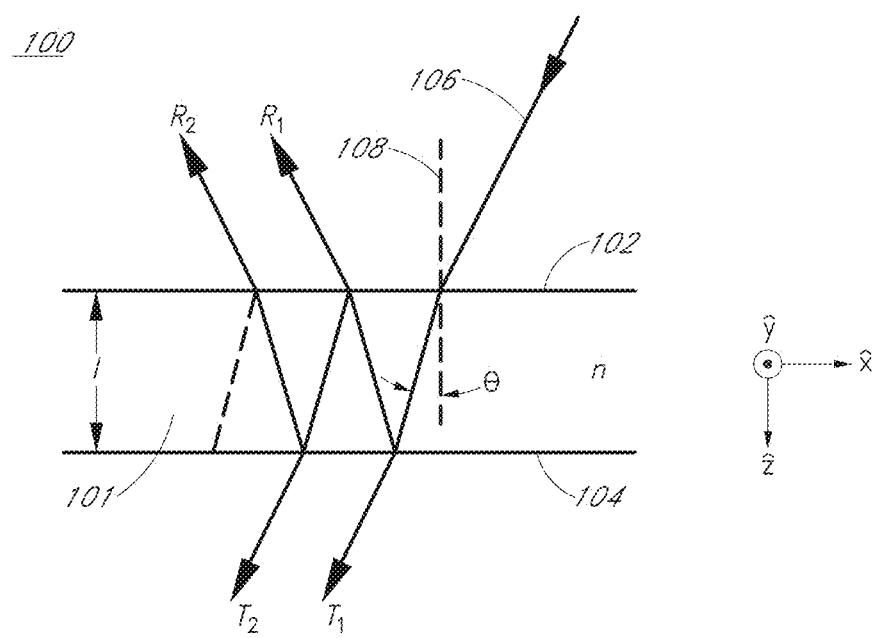
FIG. 1 is a schematic diagram of the operation of a Fabry-Perot interferometer that has a spatially invariant gap between the two optical surfaces of the interferometer.

FIG. 1 is a schematic diagram of the operation of a Fabry-Perot interferometer 100 that has a spatially invariant gap between the two optical surfaces 102, 104 of the interferometer. The Fabry-Perot interferometer 100 includes a first planar optical surface 102 that is partially transmissive and partially reflective to the incident ray of light 106. The Fabry-Perot interferometer 100 also includes a second planar optical surface 104 that is likewise partially transmissive and partially reflective to the light.

The Fabry-Perot interferometer 100 exploits a phenomenon widely observed in nature: modulation of light by wavelength dependent interference caused by multiple reflections among optical surfaces. Robert Hooke reported this phenomenon with respect to lenses in physical contact with plates. The resultant interference rings are known as Newton's rings, owing to Newton's detailed analysis of the phenomenon. The Fabry-Perot interferometer 100 exploits this phenomenon by placing two partially reflecting surfaces in close proximity, forming a resonant cavity 101. A ray of light 106 that is incident on the pair of surfaces 102, 104 will multiply reflect within the cavity 101, with interference occurring among light rays $T_1$, $T_2$ (or $R_1$, $R_2$) that exit the Fabry-Perot interferometer 100 after having traversed the cavity 101 a different number of times.

The details of how light is altered as it passes through the cavity 101 depend, to first order, upon the length (l) of the space between the reflecting surfaces, their reflectance, the angle of incidence ($\theta$) with respect to a normal 108, and the refractive index (n) of the medium in the gap between reflectors 102, 104.

The transmission of the Fabry-Perot interferometer 100 is given by the following equation (written in a form so as to emphasize the role of the phase difference $\delta$ in the face of a variable gap):

$$T = \frac{R^2 - 2R + 1}{R^2 - 2R\cos\delta + 1} \quad (1)$$

In this expression, R is the reflectance of the layers and $\delta$ is the phase difference between reflections. The variable $\delta$ is given by the following expression:

$$\delta = \frac{4\pi n \cos\theta}{\lambda} l(x) \qquad (2)$$

where n is the refractive index of the medium in the gap, θ is the angle at which the ray traverses the gap relative to the normal 108, l is the gap thickness (expressed here as an arbitrary function of position in the x-direction orthogonal to the optical axis, which in this case is parallel with the normal 108), and λ is the wavelength. The wavelength and gap thickness are in the same units.

In conventional Fabry-Perot interferometers (e.g., 100) the gap is a constant in the x-direction such that the function l(x) is equal to a constant. While scanning Fabry-Perot interferometers do vary the gap thickness in time in the longitudinal direction along the optical axis, the gap thickness still remains spatially constant (e.g., in the transverse directions orthogonal to the optical axis) at each point in time.

Historically, an air or vacuum gap Fabry-Perot device is sometimes called an interferometer, while a solid-filled gap is sometimes called an etalon, but the principles of operation are the same, and both will be referred to interchangeably in this disclosure unless specifically noted to the contrary.

Figure 2:
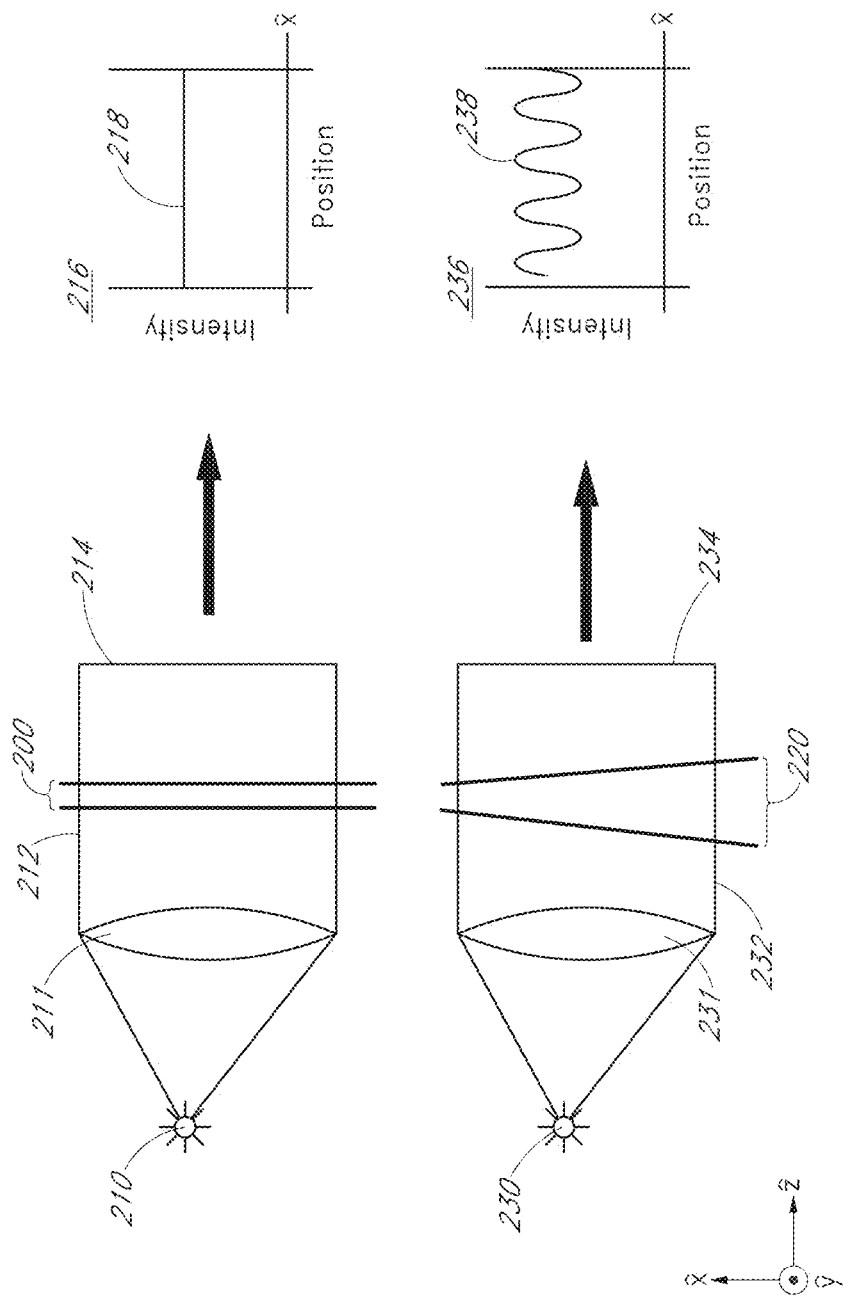
FIG. 2 illustrates the output, in response to a collimated input beam, of a Fabry-Perot interferometer that has a spatially invariant gap between the two optical surfaces of the interferometer (top), as well as that of a Fabry-Perot interferometer that has a spatially varying gap between its two optical surfaces (bottom).

FIG. 2 illustrates the output, in response to a collimated input beam, of a Fabry-Perot interferometer 200 that has a spatially invariant gap between the two optical surfaces of the interferometer (top), as well as that of a Fabry-Perot interferometer 220 that has a spatially varying gap between its two optical surfaces (bottom). The bottom portion of FIG. 2 conceptually illustrates the usage of a Fabry-Perot interferometer to construct an interference pattern with spatial fringes.

The top portion of FIG. 2 includes a monochromatic point source 210. Light from the monochromatic point source 210 is collimated by a lens 211 to create a collimated input beam 212. This collimated beam is incident upon a Fabry-Perot interferometer 200, which has a spatially invariant gap between two optical surfaces, as described above with respect to FIG. 1. With parallel optical surfaces in the interferometer 200, the interference pattern in the output beam 214 is uniform across a detecting screen (in the case of the collimated input beam 212). This is shown in the plot 216 where intensity 218 at the detector is graphed as a function of position on the detector in the x-direction. As is evident from the line 218, since the function l(x) is equal to a constant for the Fabry-Perot interferometer 200, and since the angle θ is constant for the collimated input beam 212, the intensity at the detector is also constant in the x-direction per Equations (1) and (2).

In contrast, the bottom portion of FIG. 2 illustrates the output of a Fabry-Perot interferometer 220 that has a spatially varying gap between its two optical surfaces (illustrated in FIG. 2 as non-parallel lines). In this case, a monochromatic point source 230 emits light that is collimated by a lens 231 into a collimated input beam 232 that is incident upon the Fabry-Perot interferometer 220. The Fabry-Perot interferometer 220 creates an interference pattern 238 in the output beam 234. The interference pattern 238 is shown in the plot 236 where intensity at the detector is plotted as a function of position on the detector in the x-direction. Since the plates of the Fabry-Perot interferometer 220 are not parallel, but are instead tilted with respect to one another, the gap thickness l in Equation 2 varies linearly with position in the x-direction. Accordingly, per Equations (1) and (2), the transmitted interference pattern is a periodic function, which produces a periodic signal 238 on the detector.

One characteristic of a spatial FTS is that it creates a wavelength-dependent spatial fringe pattern (e.g., a periodic fringe pattern), which is spatially sampled by a detector array and is processed using, for example, a Fourier transform to determine the spectrum. Some conventional FTS instruments use either beamsplitter-based interferometers, or birefringent crystals with appropriate polarizers to produce the fringe pattern. However, as illustrated in the bottom portion of FIG. 2, the spatial FTS described herein uses a Fabry-Perot interferometer with a spatially varying gap to produce the fringe pattern.

Figure 3:
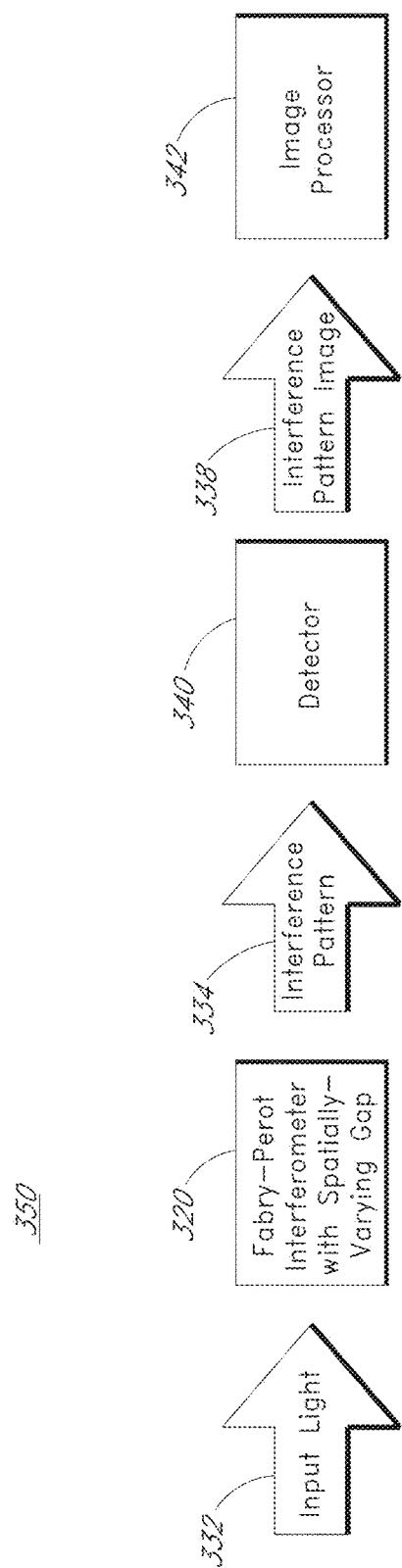
FIG. 3 is a block diagram of an embodiment of a Fourier transform spectrometer that uses a Fabry-Perot interferometer with a spatially varying gap between two optical surfaces to create an interference pattern.

FIG. 3 is a block diagram of an embodiment of a Fourier transform spectrometer 350 that uses a Fabry-Perot interferometer 320 with a spatially varying gap between two optical surfaces to create an interference pattern 334. The Fourier transform spectrometer 350 can receive input light 332 from any source whose spectral content is desired to be measured. Embodiments of the FTS described herein can operate in, for example the visible and infrared regions of the electromagnetic spectrum. The input light 332 is directed to the Fabry-Perot interferometer 320 with a spatially varying gap.

The Fabry-Perot interferometer 320 creates an interference pattern 334, which is directed to a detector 340. The detector 340 may include a plurality of detecting elements arranged in a one-dimensional linear array in order to simultaneously spatially sample the interference pattern 334 at different locations. The detecting elements can also be arranged in a two-dimensional array, for example, in the case of the Fourier transform spectrometer 350 being an imaging spectrometer. In this way, the detector 340 creates an interference pattern image 338. The detector 340 can include a number of detecting elements arranged in a plane that is, for example, orthogonal to the optical axis of the instrument. The detector 340 can also have a higher-dimensionality (e.g., the detecting elements could be arranged on the surface of a cylinder or other non-planar surface).

In some embodiments, the Fabry-Perot interferometer 320 is designed so as to produce symmetric interferograms, where the OPD function across the detector array is linear and is equal to zero at the center of the fringe pattern. The geometry shown in the bottom portion of FIG. 2 does not reach zero OPD. To achieve zero OPD, the two surfaces meet in optical contact. This can be achieved in many different ways, two of which are shown in FIGS. 4 and 5.

The detector is communicatively coupled to an image processor 342. The image processor 342 receives the interference pattern image from the detector and executes image processing algorithms to convert the interference pattern image 338 from the spatial domain to the frequency domain. The image processor 342 can perform this conversion using many different techniques, including, for example, a Fourier transform. In some embodiments, the discrete Fourier Transform can be modified to use basis functions other than sines, cosines, or equivalent exponential forms that would perform the function of a Fourier Transform but not necessarily be defined as a Fourier Transform. Neural networks or other statistical methods could also be used to convert the data to the spectral domain without the use of the Fourier Transform as typically mathematically defined. Other conversion techniques can be used in addition to, or in place of, a Fourier transform; despite this type of instrument being commonly known as a Fourier transform spectrometer, the image processor 342 need not necessarily perform a Fourier transform on the interference pattern image 338.

Figure 4:
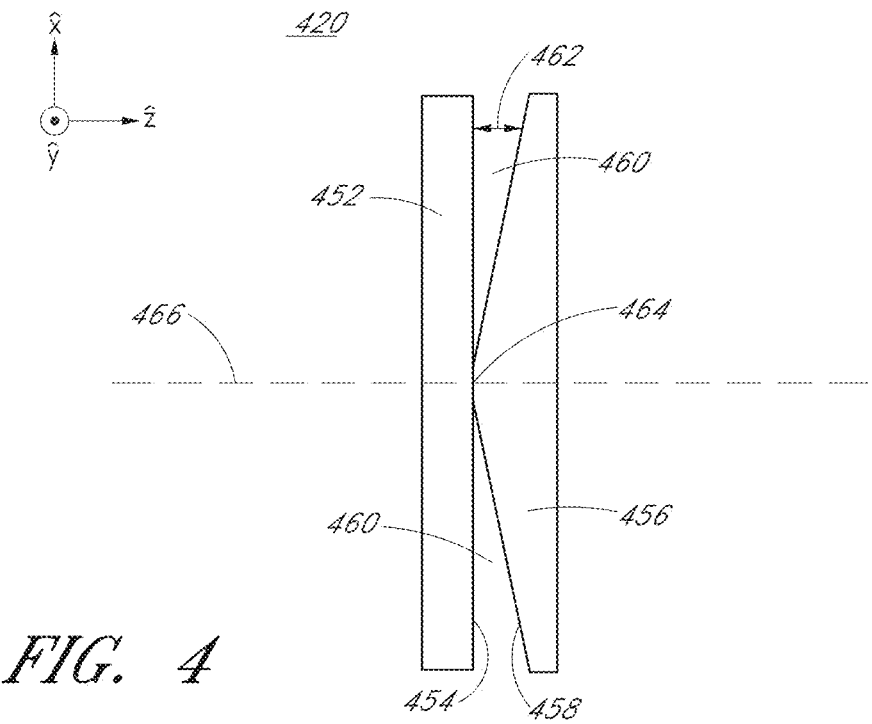
FIG. 4 illustrates an embodiment of a Fabry-Perot interferometer that can be used in the Fourier transform spectrometer of FIG. 3.
Figure 5:
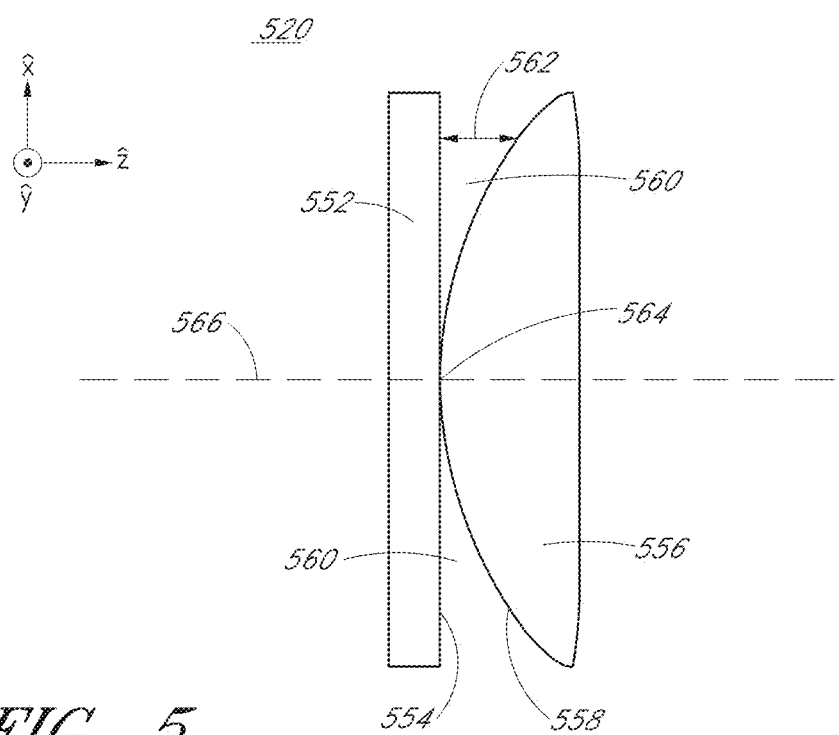
FIG. 5 illustrates another embodiment of a Fabry-Perot interferometer that can be used in the Fourier transform spectrometer of FIG. 3.

FIG. 4 illustrates an embodiment of a Fabry-Perot interferometer 420 that can be used in the Fourier transform spectrometer 350 of FIG. 3. The Fabry-Perot interferometer 420 includes a first optical surface 454 and a second optical surface 458, which are both partially transmissive and partially reflective to the light whose spectral content is to be measured. In some embodiments, the first optical surface 454 is the rear surface of a first optical element 452 located along the optical axis 466. The second optical surface 458 can be, for example, the front surface of a second optical element 456 located along the optical axis 466. In some embodiments, the optical axis 466 is orthogonal to a detector (not shown in FIG. 4) to which light from the Fabry-Perot interferometer 420 is directed, whether by transmission or reflection, after having passed through the interferometer 420.

The first and second optical surfaces 454, 458 jointly define a resonant cavity 460 between themselves. As illustrated in FIG. 4, the gap 462 between the first and second optical surfaces 454, 458 varies in a transverse direction that is substantially orthogonal to the optical axis 466. Specifically, the gap 462 varies in the x-direction, while the optical axis 466, along which light travels through the Fourier transform spectrometer, extends longitudinally in the z-direction. In some embodiments, the gap 462 varies in a direction with respect to the optical axis 466 that corresponds to the direction in which detector elements (e.g., pixels) of the detector are arranged with respect to the optical axis.

In the particular embodiment illustrated in FIG. 4, the first optical surface 454 is substantially planar and the first optical element 452 is a plate. Meanwhile, the second optical surface 458 includes two angled planar segments that join at a vertex area 464, and the second optical element 456 is a prism. The vertex area 464 of the prism 456 is in optical contact with the first optical surface 454 near the location 464 where the optical axis 466 intersects the interferometer 420, though this is not required. In some embodiments, the prism 456 includes a flat portion at the vertex area 464 in order to facilitate optical contact between the first and second optical elements 452, 456. While the second optical surface 458 is illustrated as being made up of two segments, either optical surface could be made up of any number of segments.

Although the first and second optical surfaces 454, 458 of the Fabry-Perot interferometer 420 are illustrated as being planar or piecewise planar, this is not required. Indeed, the first and second optical surfaces 454, 458 can have any shape so long as the gap 462 between them varies as a function of location (e.g., transverse to the optical axis) within the resonant cavity 460. For example, the first and/or second optical surfaces 454, 458 can be linear, curvilinear, or piecewise combinations of linear and curvilinear segments. In addition, the first and/or second optical surfaces 454, 458 can be smooth, discontinuous, pointed, etc.

The width of the gap 462 varies as a function of position in the x-direction within the resonant cavity 460. The precise variation of the gap width 462 is dependent upon the shape of the first and second optical surfaces 454, 458 and how they vary with respect to one another. In some embodiments, the gap width varies linearly, as illustrated by the Fabry-Perot interferometer 220 shown in FIG. 2, or piecewise linearly, as illustrated by the Fabry-Perot interferometer 420 shown in FIG. 4. This linear variation in the gap width can be caused by a linear slope of one or both of the optical surfaces 454, 458, or by optical surfaces with more complex shapes which, together, still result in a linear variation in gap width.

Linear variation in the gap width is not required, however. In fact, the variation of the width of the gap 462 can be non-linear or arbitrary. The variation in gap width can be, for example, linear or have a higher-order representation. The slope of the optical surfaces 454, 458 with respect to one another can be set, in conjunction with, for example, the pitch of detector elements, to determine the wavelength range over which the Fourier transform spectrometer can operate. Steeper sloping surfaces create higher frequency spatial fringes in the interference pattern, which can result in higher frequency spectral content.

As already discussed, the gap width between the optical surfaces of the Fabry-Perot interferometer need not necessarily vary linearly or piecewise linearly (e.g., in the direction orthogonal to the optical axis of the instrument). If, however, the spatial variation of the gap width is known, regardless of the shape, the spectrum of the input light can be accurately reconstructed in post-processing. While non-linear spatial variation in the gap width may distort the resulting interference pattern, such distortion can be corrected based on accurate knowledge of the gap width variation as a function of spatial position.

In some embodiments, the gap in the resonant cavity 460 can have a minimum value of zero, which can be achieved at, for example, the center (e.g., 464) of the interferometer 424 or one or more other locations (e.g., peripheral portions of the interferometer 424). Alternatively, the gap in the resonant cavity 460 can have a non-zero minimum value at one or more locations, and the first and second optical elements 452, 456 can be held in the desired position with respect to one another by appropriate structural supports.

In some embodiments, the first and second optical surfaces 454, 458 have one or more locations where they physically contact one another. In such embodiments, the gap 462 between the first and second optical surfaces 454, 458 may approach but not exactly reach zero. In other embodiments, however, the first and second optical surfaces 454, 458 have one or more locations where they are in optical contact with one another such that the gap 462 between them does reach zero. Optical contact between the first and second optical surfaces 454, 458 can be achieved in several ways, including applying pressure to force the first and second optical elements 452, 456 against one another, applying index-matching optical cement at the contact location(s), etc. Thin films of metals or metal oxides can also be used. In still other embodiments, however, the first and second optical surfaces 454, 458 do not contact one another. In FIG. 4, the first and second optical surfaces 454, 458 are in optical contact with one another at the center of the Fabry-Perot interferometer. However, other designs could be used in which the first and second optical surfaces 454, 458 optically contact one another at other locations or not at all.

As already discussed, the gap between the first and second optical surfaces 454, 458 varies spatially in at least one direction. Specifically, in the embodiment illustrated in FIG. 4, the gap varies in the x-direction, which is transverse to the longitudinal z-direction and the optical axis 466. The gap between the first and second optical surfaces 454, 458 can vary in other directions as well. For example, the gap 462 may also vary, for example, in the y-direction in addition to the x-direction. In such embodiments, the interference pattern created by the Fabry-Perot interferometer 420 can have fringes formed in multiple directions so as to enable the spectral content of the light source to be resolved in multiple directions. In some embodiments, the variation in gap width is symmetric about the optical axis 466, though this is not required.

The resonant cavity 460 can be vacuum sealed, or can be filled with a gas (e.g., air) or liquid. Alternatively, the resonant cavity can be filled with a solid material. In such embodiments, the first and second optical surfaces 454, 458 can be front and rear surfaces of a single optical element.

The interference pattern created by the Fabry-Perot interferometer 420 is a pattern of lighter and darker fringes. The fringes may be, for example, spatially periodic. A detector with an array of detecting elements (e.g., pixels) can be positioned with respect to the Fabry-Perot interferometer 420 so as to form an image of the interference pattern. In some embodiments, each of the detecting elements substantially simultaneously samples the interference pattern at a different spatial location.

In some embodiments, the Fourier transform spectrometer (e.g., 350) and/or the Fabry-Perot interferometer (e.g., 420) described herein contain no moving parts. Alternatively, the first and second optical surfaces 454, 458 of the Fabry-Perot interferometer (e.g., 420) may be movable with respect to one another. For example, the first and second optical surfaces 454, 458 can be moved longitudinally in the z-direction along the optical axis 466, or tilted with respect to one another, so as to adapt the interferometer to various applications. Such movement can be provided by, for example, a piezoelectric transducer, a precision motor, etc. It is important to note, however, that even in such embodiments the gap between the first and second optical surfaces 454, 458 varies spatially as discussed herein. Moreover, it is important to note that such embodiments do not require movement of the first and second optical surfaces 454, 458 with respect to one another, or any other time-varying characteristic of the interferometer (e.g., 420), in order to collect the information needed to determine the spectral content of the input light.

Unlike other types of Fourier transform spectrometers which may use scanning Fabry-Perot interferometers, embodiments of the Fourier transform spectrometer described herein do not require that any characteristic of the Fabry-Perot interferometer (e.g., gap width, index of refraction, angle of orientation, etc.) be temporally varied in order to measure an interferogram which can be processed to reveal the spectrum of the input light. Thus, while some embodiments of the Fabry-Perot interferometer (e.g., 420) described herein may be capable of controlled temporal variation of some characteristic, such as the relative position of the first and second optical surfaces (e.g., 454, 458), each interferogram that is collected for the purpose of analyzing the spectral content of input light is captured without intentionally temporally varying the relative position of the optical surfaces or any other characteristic of the Fabry-Perot interferometer while the interferogram is being captured.

FIG. 5 illustrates another embodiment of a Fabry-Perot interferometer 520 that can be used in the Fourier transform spectrometer 350 of FIG. 3. The Fabry-Perot interferometer 520 likewise includes first and second optical surfaces 554, 558 that create a resonant cavity 560 therebetween. In addition, the first optical surface 554 is the substantially planar rear surface of an optical plate 552 that is disposed orthogonal to the optical axis 566 of the interferometer 520. The second optical surface 558, however, is the convex portion of a plano-convex lens 556. In some embodiments, the lens 556 is a cylindrical lens, though it could also be spherical or aspherical, for example.

The Fabry-Perot interferometer 520 is formed by bringing the lens 556 into optical contact with the plate 552. In this manner, a resonant cavity 560 is formed between the first and second optical surfaces 554, 558. In this case, the gap 562 between the first and second optical surfaces 554, 558 varies non-linearly in the x-direction, which is orthogonal to the optical axis 566. The gap 562 is zero at the location 564 where the optical axis 566 intersects the resonant cavity 560. This non-linear variation in the gap width can lead to some distortion in the interference pattern produced by the Fabry-Perot interferometer 520. However, since the spatial variation of the gap width is known, its effect on the interference pattern can be calculated and corrected in post-processing. Thus, non-linearly varying gaps may create interference patterns that can be linearized for further processing if so desired.

Figure 6:
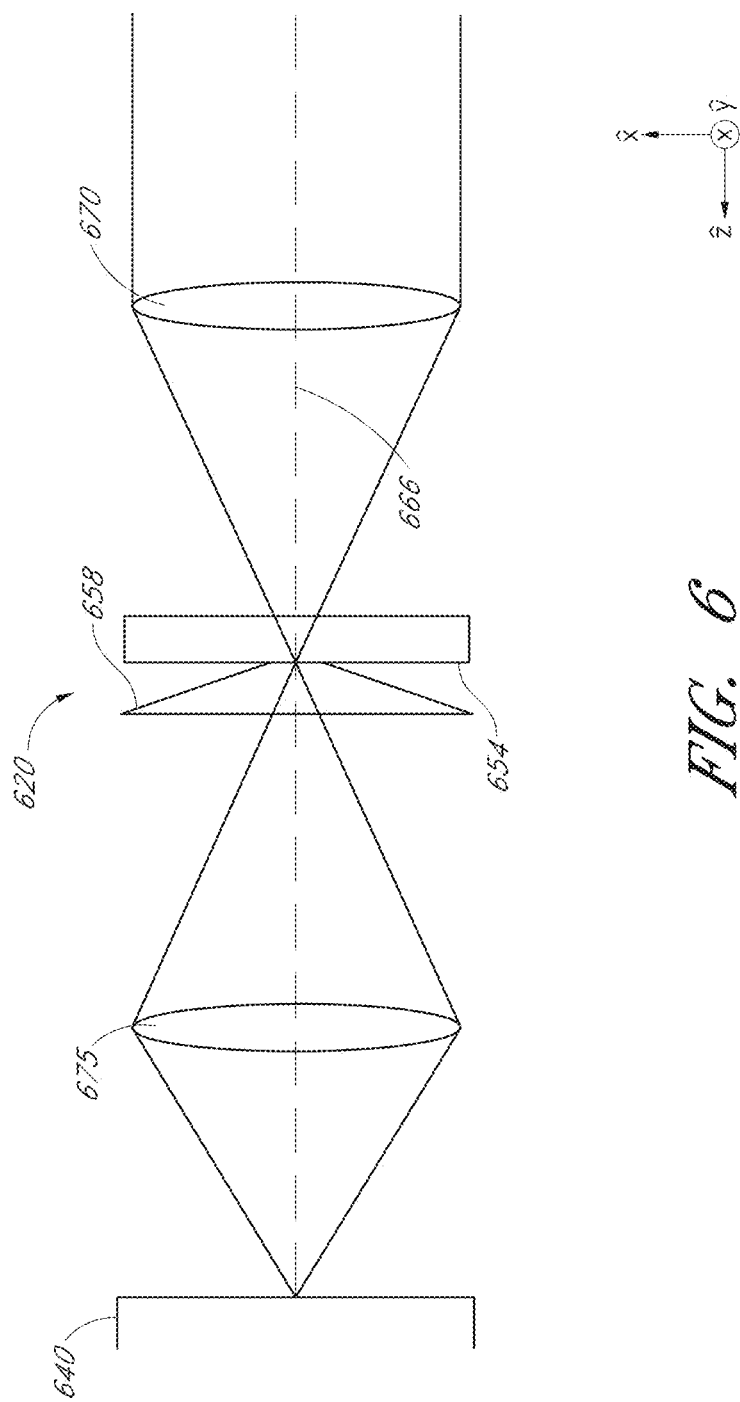
FIG. 6 is a schematic diagram of a Fourier transform spectrometer that uses a Fabry-Perot interferometer with a spatially varying gap, and that includes a light collection optical system, and an interference pattern relay optical system.

FIG. 6 is a schematic diagram of a Fourier transform spectrometer 650 that uses a Fabry-Perot interferometer 620 with a spatially varying gap, and that includes a light collection optical system 670, and an interference pattern relay optical system 675. The Fabry-Perot interferometer 620 has first and second optical surfaces 654, 658, as discussed herein. The light collection optical system 670 can include one or more optical elements (e.g., lens elements) for collecting light from a source and directing it toward the Fabry-Perot interferometer 620 in a suitable manner, depending upon the application. For example, in some embodiments, the light collection optical system 670 is configured to image a light source onto the Fabry-Perot interferometer 620. In such embodiments, the focal length and other characteristics of the light collection optical system 670 are set so that the source and the Fabry-Perot interferometer 620 are located at conjugate optical planes. In other embodiments, the light collection optical system may be configured to form a collimated input beam for the interferometer 620. It should also be understood, however, that some embodiments of the Fourier transform spectrometer described herein do not include a light collection optical system.

The interference pattern relay optical system 675 can be used to relay the interference pattern formed by the Fabry-Perot interferometer 620 to the detector 640. It can include one or more optical elements (e.g., lens elements), and can be configured, for example, such that the detector 640 and the Fabry-Perot interferometer 620 are located at conjugate optical planes. In some embodiments, the relay optical system 675 and the detector 640 are integrated as a camera. In some embodiments, the Fabry-Perot interferometer with spatially varying gap 620 can likewise be integrated into such a camera. In some embodiments, the detector 640, the interference pattern relay optical system 675, the Fabry-Perot interferometer 620, and the light collection optical system 670 share a common optical axis 666.

The Fabry-Perot interferometer 620 may cause double images to be formed at the detector. However, such double images, as well as additional Fresnel interference, can be managed by, for example, allotting enough space at optical contact so that the beams do not recombine at the detector. In some embodiments, an advantage of using a relay optical system 675 to transfer the interference pattern from the interferometer 620 to the detector 640 is that a relatively slow beam can be used at the input side of the interferometer, and magnification can raise the final f-number presented to the detector to enhance sensitivity.

It should be understood that some embodiments of the Fourier transform spectrometer described herein do not include an interference pattern relay optical system. In such embodiments, for example, the detector 640 may be located in close enough proximity to the Fabry-Perot interferometer 620 that the interference pattern generated by the interferometer can be satisfactorily captured by the detector 640 without the use of optics for transferring the interference pattern to the detector. For example, the detector 640 may be placed in optical contact with the Fabry-Perot interferometer 620. In some embodiments, a filter, such as a Bayer filter or other filter mask, or other optical component can additionally be provided between the Fabry-Perot interferometer 620 and the detector 640.

In some embodiments, the Fourier transform spectrometer 650 includes a scanner for scanning the field of view of the spectrometer over a surface to be imaged. For example, the scanner could scan the field of view of the spectrometer in a direction that is both orthogonal to the optical axis of the instrument and to the transverse direction in which the gap width of the Fabry-Perot interferometer 620 varies.

Usage of a Fabry-Perot interferometer with a spatially varying gap in a Fourier transform spectrometer leads to several design considerations, which will be discussed with respect to FIGS. 7-14.

Figure 7:
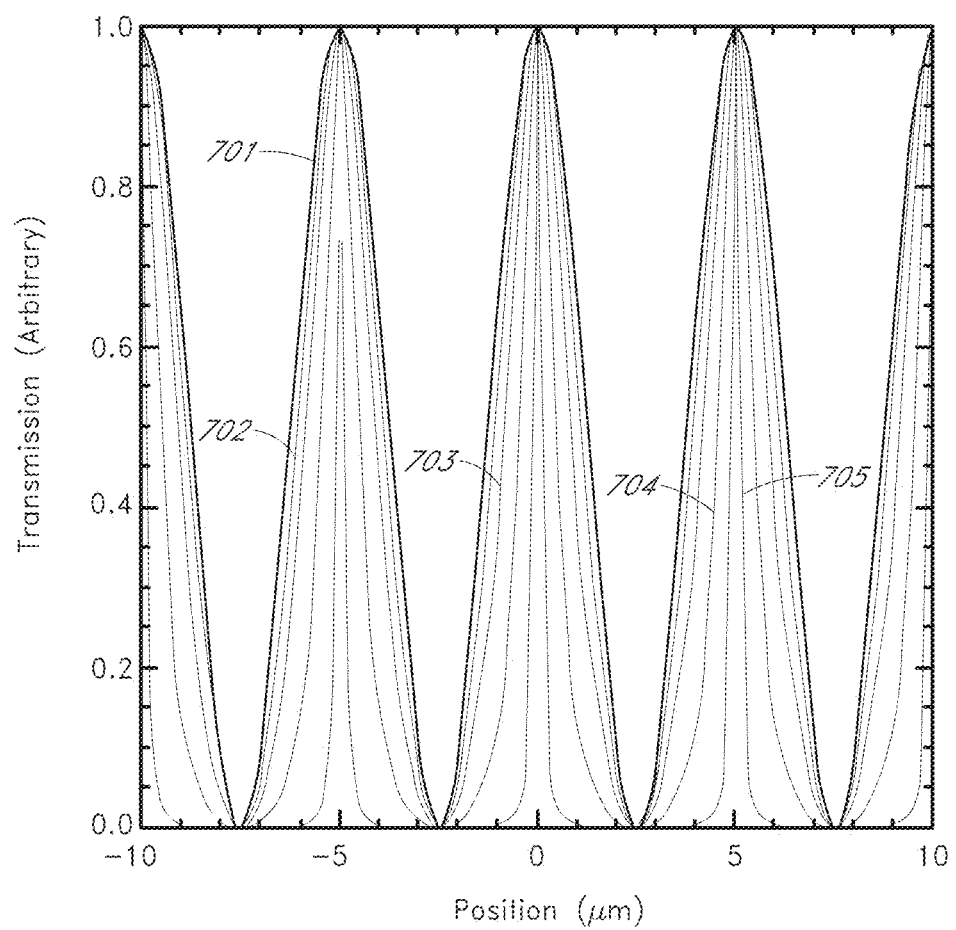
FIG. 7 is an example plot that illustrates the transmission of monochromatic light through a Fabry-Perot interferometer with a spatially varying gap between two optical surfaces, the transmission being shown for a range of reflectance values of the optical surfaces.

FIG. 7 is an example plot 700 that illustrates the transmission of monochromatic light through a Fabry-Perot interferometer with a spatially varying gap between two optical surfaces, the transmission being shown for a range of reflectance values of the optical surfaces. Transmission through the interferometer is plotted as a function of position (e.g., in the direction in which the gap thickness of the Fabry-Perot interferometer varies) and is normalized to unit modulation of peaks compared to troughs. Each of the transmission curves 701-705 on the plot 700 represents a different reflectance value for the optical surfaces of the Fabry-Perot interferometer. The most sinusoidal-like function (i.e., curve 701) occurs with very low layer reflectance, while high reflectance produces periodic narrow peaks (i.e., curve 705).

Since the periodic signal from a Fabry-Perot interferometer or etalon with a spatially variable gap is not a pure sinusoid, the Fourier transform of an interference pattern produced by the device for a monochromatic input signal exhibits sidelobes at integer multiples of the major frequency, reflecting the presence of the multiple passes through the interferometer.

Figure 8:
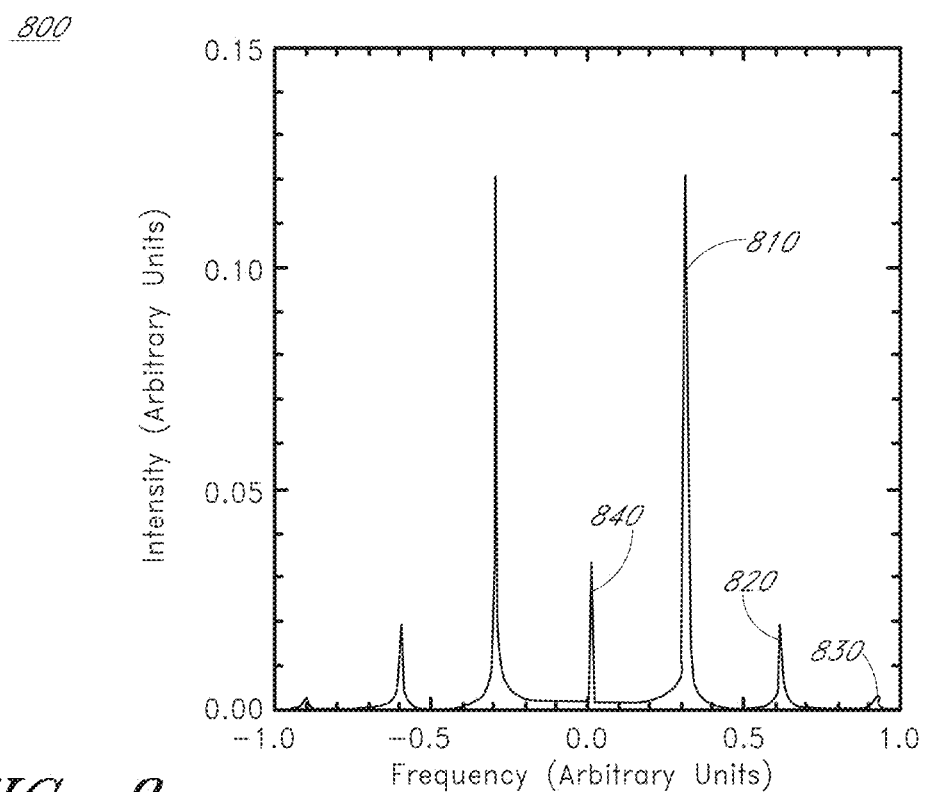
FIG. 8 is an example plot that illustrates the Fourier transform of the curve from FIG. 7 that corresponds to a Fabry-Perot interferometer having 18% reflecting optical surfaces.

FIG. 8 is an example plot 800 that illustrates the Fourier transform of the curve from FIG. 7 that corresponds to a Fabry-Perot interferometer having 18% reflecting optical surfaces. The magnitude of the Fourier transform is plotted as a function of frequency, both in arbitrary units. The main, fundamental frequency 810 is at +/−0.3 units, and higher order sidelobes 820, 830 are apparent at higher frequencies. Specifically, given the periodic nature of the interference pattern, a first sidelobe 820 appears at 0.6 units and a second sidelobe 830 appears at 0.9 units, which are both integer multiples of the fundamental frequency. The peak 840 at zero frequency is due to a small DC offset in the input function.

The higher order sidelobes 820, 830 may represent intolerable spectral contamination if the bandwidth of the sidelobes is large enough to overlap with the main frequency content. The higher order sidelobes 820, 830 may, therefore, provide some constraints on the Fourier transform spectrometer described herein. If the sidelobes are large with respect with some metric depending on the application, the uncontaminated portion of the spectrum (between the sidelobes) may be a factor of two of a designed wavelength. Thus, in some embodiments, the Fourier transform spectrometer (e.g., 350) is limited to factors of two in wavelength.

Figure 9:
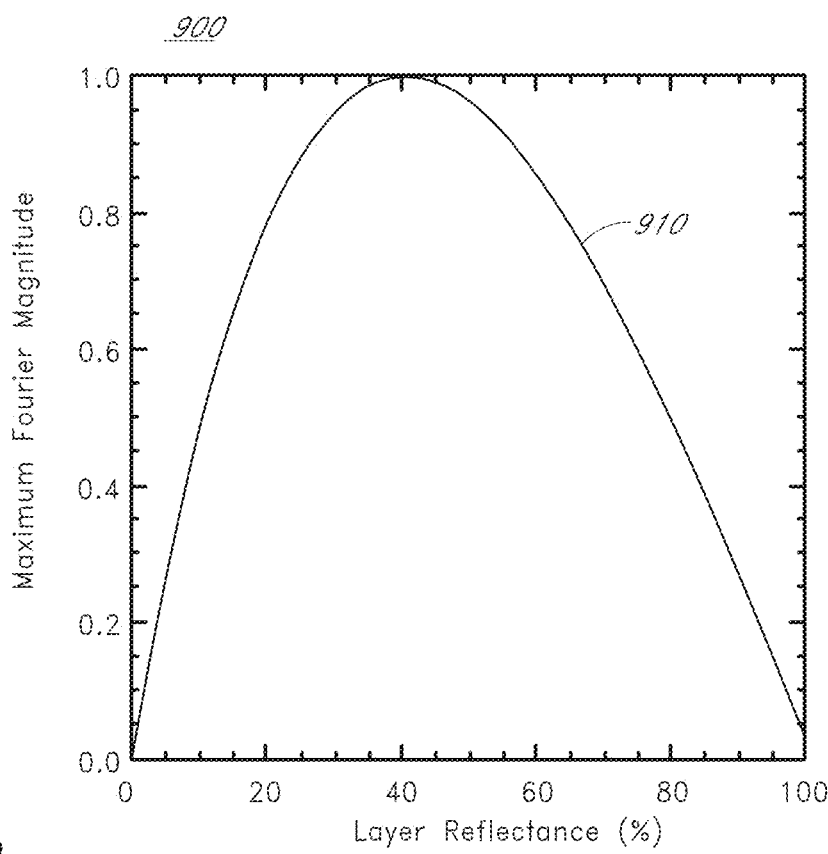
FIG. 9 is an example plot that illustrates the peak Fourier magnitude of a monochromatic source as a function of surface reflectance for a Fabry-Perot interferometer that has a spatially varying gap.

FIG. 9 is an example plot 900 that illustrates the peak Fourier magnitude 910 of a monochromatic source as a function of surface reflectance for a Fabry-Perot interferometer that has a spatially varying gap. The curve 910 reflects competing influences of total reflectance, non-sinusoidal behavior, and modulation efficiency.

The reflectance of the surface layers (e.g., 454, 458) of the Fabry-Perot interferometer (e.g., 420) which produces the maximum signal in the interference pattern image is a compromise between three characteristics of the interferometer: The net reflectivity (controlling the rejection of input photons), the fringe contrast that contains the interpretable spectral signal, and leakage of signal power into sidelobes. It is assumed, merely for the sake of analysis, that the net efficiency of the Fabry-Perot interferometer versus layer reflectivity can be characterized by the peak magnitude of the Fourier transform of the interference pattern image that results from a monochromatic input signal. At very low layer reflectance, peak-to-trough modulation is low, so signal is low. At very high reflectance the device rejects most input photons and exhibits extreme sidelobes so efficiency is also low. In between these extremes there is a maximum.

The plot 900 in FIG. 9 illustrates how one measure of efficiency of the Fabry-Perot interferometer varies as a function of layer reflectance. As just discussed, the efficiency, as measured by maximum Fourier magnitude, is lower for both high and low layer reflectances. The plotted efficiency 910 shows a relative maximum near 40% reflectance. Thus, in some embodiments, the first and second optical surfaces (e.g., 454, 458) of the Fabry-Perot interferometer (e.g., 420) are provided with a reflectance of approximately 40% in order to increase or maximize efficiency. In some embodiments, the first and second optical surfaces of the Fabry-Perot interferometer are provided with a reflectance in the range of approximately 20%-60%. In some embodiments, the first and second optical surfaces are provided with a reflectance in the range of approximately 10%-70%. One or both of the first and second optical surfaces may have a reflectance in these ranges. Moreover, both optical surfaces may have substantially the same reflectance, or they may have different reflectance values. In some embodiments, the reflectance of the first and second optical surfaces of the Fabry-Perot interferometer is set by using uncoated materials whose refractive indexes provide Fresnel reflectance of the desired level. Alternatively, and/or in addition, the first and second optical surfaces can be provided with metal and/or dielectric coatings to achieve the desired reflectance values.

The metric illustrated in FIG. 9 is relative, adequate to specify layer reflectances which yield relatively higher efficiencies, but not to predict radiometric performance quantitatively, which involves a measure of absolute efficiency. The absolute efficiency can be defined, merely for the sake of analysis, as the product of the modulation efficiency of the fringes in the interference pattern produced by the Fabry-Perot interferometer, and the peak signal, where the latter is normalized to 100% modulation and the efficiency at zero reflectivity (true sinusoid). The peak signal term includes the losses due to reflectivity and sidelobe terms, as discussed herein. For the purposes of this analysis, the modulation is defined as the difference between the maximum and minimum of the signal, normalized to the maximum signal. The normalized peak intensity is the peak magnitude of the Fourier transform of a monochromatic input to Equation 1, with inputs normalized to 100% modulation, and output normalized to the response to a pure sinusoid.

Figure 10:
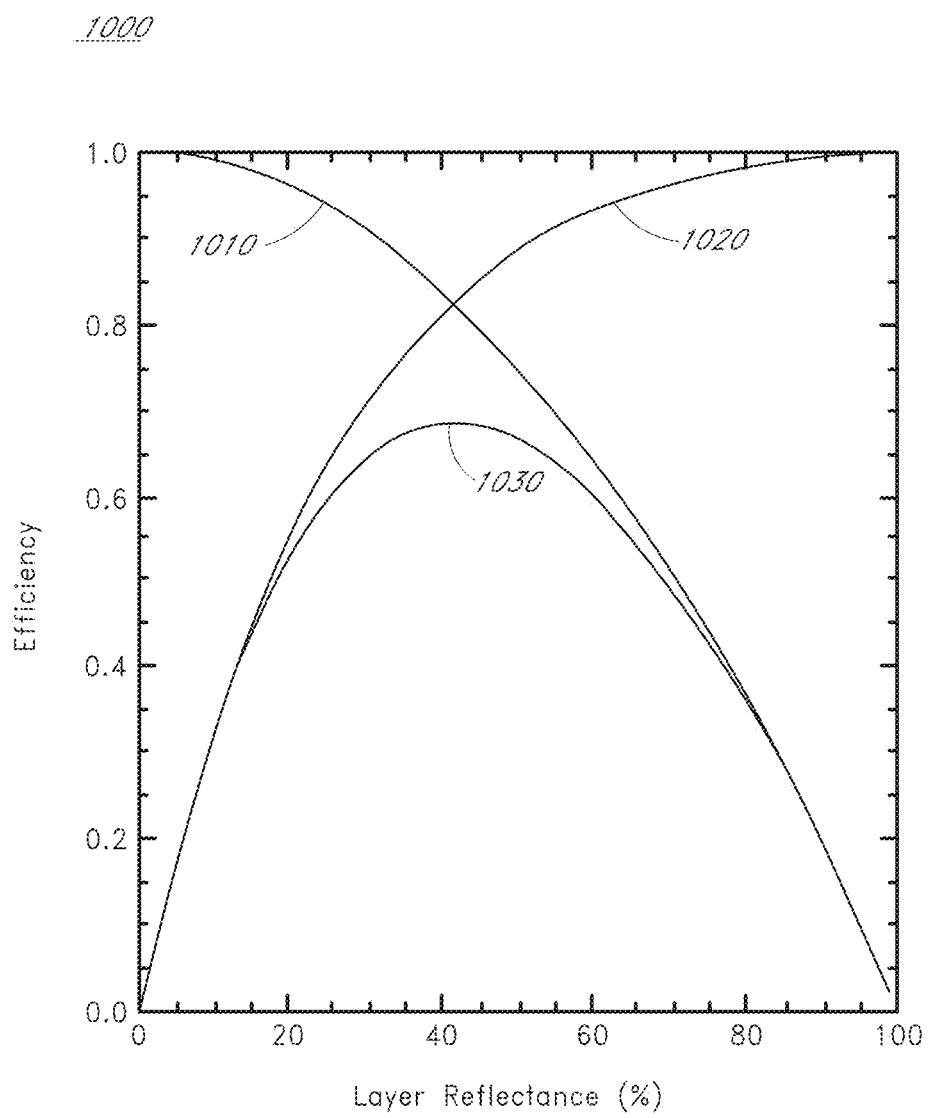
FIG. 10 is an example plot that shows an estimate of absolute efficiency for a Fourier transform spectrometer that uses a Fabry-Perot interferometer with a spatially varying gap.

FIG. 10 is an example plot 1000 that shows an estimate of absolute efficiency 1030 for a Fourier transform spectrometer that uses a Fabry-Perot interferometer with a spatially varying gap. The curve 1010 that peaks at zero reflectance is the magnitude of the Fourier transform of the interference pattern which results from a monochromatic input, this time with the input normalized to 100% modulation, and with the output normalized to the output of a pure sinusoid. The curve 1020 that peaks at 100 percent reflectance is the modulation efficiency. The third curve 1030 is the efficiency estimate, which is the product of the two other curves 1010, 1020. The efficiency estimate 1030 indicates that efficiency of the Fabry-Perot interferometer peaks near 40% reflectance, with a maximum efficiency near 70%, according to this particular estimate.

Figure 11:
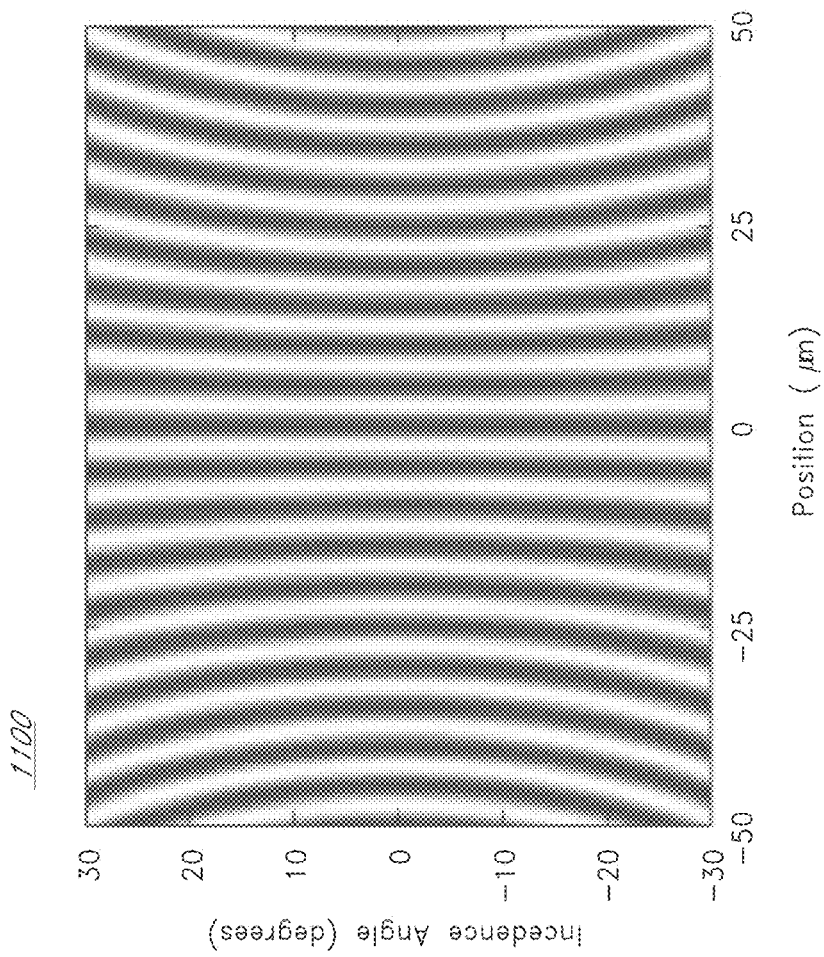
FIG. 11 is an example interference pattern image from a Fabry-Perot interferometer with a spatially varying gap that illustrates the effect of incidence angle on the fringe period for a monochromatic input beam.

FIG. 11 is an example interference pattern image 1100 from a Fabry-Perot interferometer with a spatially varying gap that illustrates the effect of incidence angle on the fringe period for a monochromatic input beam. As discussed herein, in some embodiments, the Fabry-Perot interferometer is used at an image plane of a light collection optical system (e.g., 670). Each point in the image is made up of light rays converging from a range of different angles, the range of angles being dependent upon the imaging optics. In such embodiments, the imaging of light at the Fabry-Perot interferometer (e.g., 620) causes light that is ultimately incident upon a single pixel in the detector array (e.g., 640) to have traversed the Fabry-Perot interferometer (e.g., 620) over a range of angles. This affects the interference pattern because the fringe period of the interference pattern created by the interferometer is a function of the angle at which light traverses the interferometer.

If the fringe period is defined as the spacing between adjacent maxima, transmission maxima occur where the cosine of the phase difference δ is unity (Equation 1), and δ itself has a value of π(N+1/2), where N is an integer. From Equation 2, the fringe spacing is proportional to a unit difference between the values of N. Using N=0 (δ=π/2) and N=1 (δ=3π/2), the result after simplification is:

$$\Delta l = \frac{\lambda}{4\cos\theta} \quad P = S\frac{\lambda}{4\cos\theta} \tag{3}$$

where Δl is the gap difference from peak to peak, P is the spatial period in micrometers, λ is the wavelength in micrometers, and S is the slope of the variable gap. Because the fringe period is a function of the angle at which rays traverse the gap between the optical surfaces of the Fabry-Perot interferometer, a range of angles at a given point causes a range of fringe periods to be measured at that point. If the interference pattern is imaged by a practical camera with a finite f-number, each pixel will collect light resulting from a range of incidence angles. Accordingly, these fringe patterns, with a range of periods, sum at the detector. As illustrated in FIG. 11, the fringe period of the interference pattern increases with increasing incidence angle. Accordingly, as shown in the figure, the fringes begin to bend away from the vertical for higher incidence angles as the period of each fringe becomes larger.

The mix of light at each pixel of the detector that has traversed the Fabry-Perot interferometer at different angles may limit the resolution of the instrument in two ways. First, a narrow-band input optical signal will be broadened in the final measured spectrum, as the transform from the spatial domain of the image data to the frequency domain of the spectral data will place the signal at slightly different frequencies depending on the zone of the light collection lens from which a given ray passed to the interferometer. Second, when the light rays at each detector pixel are summed over a range of angles, a null can form where the phase of the extreme angles are out of phase by 180 degrees.

Figure 12:
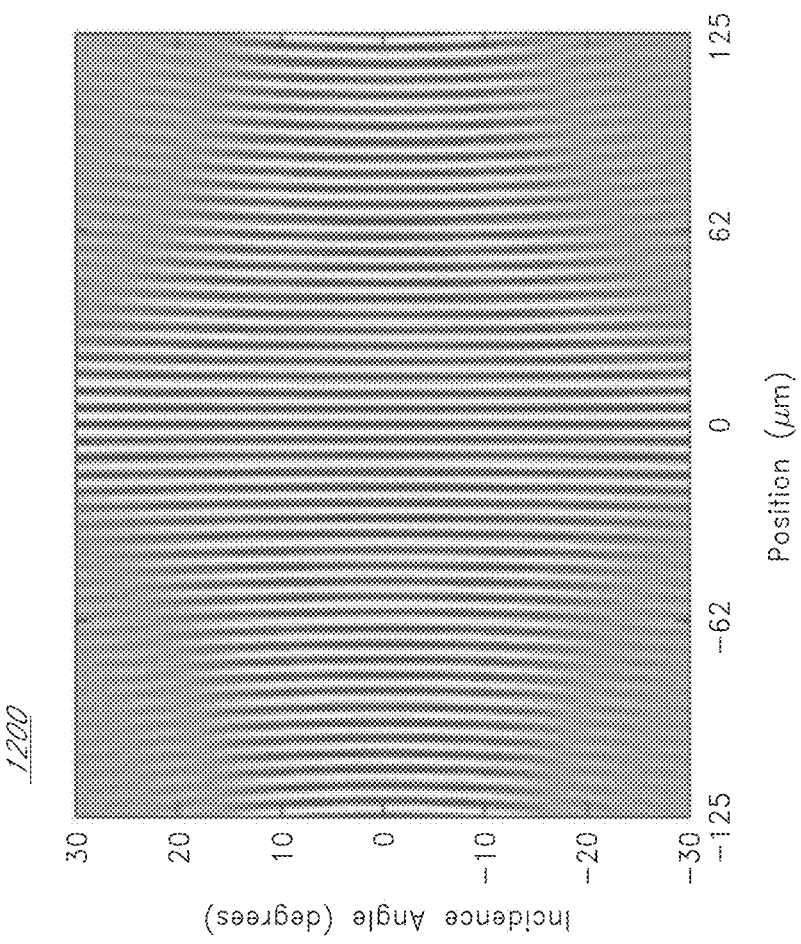
FIG. 12 is an example interference pattern image that shows the signal at each incidence angle integrated over the range from 0° to the given incidence angle.

FIG. 12 is an example interference pattern image 1200 that shows the signal at each incidence angle integrated over the range from 0° to the given incidence angle. As illustrated, a null occurs toward the edges of the frame as incidence angle increases due to the signals at the extreme angles going out of phase and canceling. The null can be observed experimentally, and can be taken as the resolution limit, for some applications, of the Fabry-Perot interferometer with a spatially varying gap that is described herein. The null can be expressed as a function of the extreme angles present. In an unobscured optical system, one extreme is 0 degrees (e.g., the optical axis). In a system with a central obscuration, the value would be at some other angle. The other extreme may be defined by, for example, the f-number of the light collection optical system.

The null occurs when the number of fringes at $\theta_1$ is equal to the number of fringes at $\theta_2$, plus one half, and is:

$$FP_1 = FP_2 + \frac{P_2}{2} \text{ or } F = \frac{P_2}{2(P_1 - P_2)} \tag{4}$$

where F is the number of fringes, and the subscripts indicate the extreme angles. Assuming an unobscured system ($\theta_1=0$), the number of fringes to reach the null is:

$$F = \frac{1}{2\cos\theta_2 - 1} \tag{5}$$

The resolution is tightly coupled with the number of fringes observed. Conventionally, the resolution of an FTS is:

$$\Delta\sigma_c = \frac{\sigma_c}{M} \tag{6}$$

where $\delta\sigma_c$ is the resolution in wavenumbers, $\sigma_c$ is the "cutoff frequency" (the highest frequency measurable by the system) at Nyquist sampling (two samples/period) to avoid aliasing, and where M is the number of samples in a single sided interferogram. At Nyquist sampling, by definition the number of samples M is twice the number of fringes F, so the spectral resolution R (λ/Δλ or σ/Δσ) is:

$$R = \frac{\sigma_c}{\Delta\sigma_c} = 2F \tag{7}$$

Figure 13:
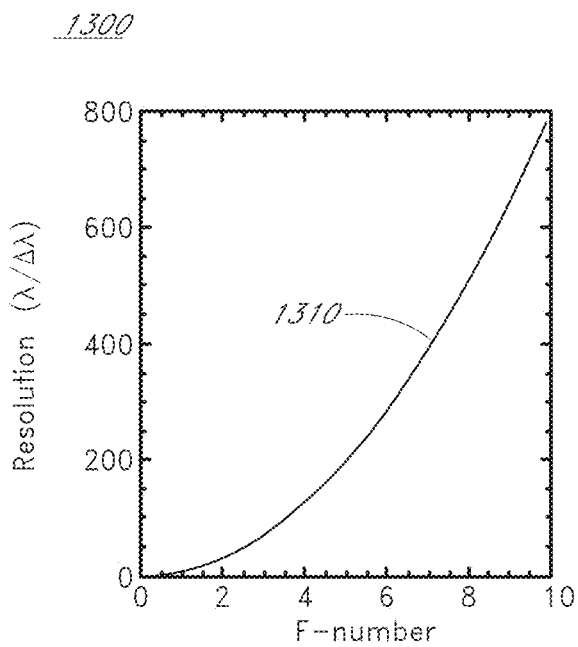
FIG. 13 is an example plot that shows the resolving power, as a function of f-number of the input light, for a Fabry-Perot interferometer with a spatially varying gap filled with air.

Using Equation 7, the resolution attainable with a Fabry-Perot interferometer having a spatially varying gap is shown in FIG. 13. FIG. 13 is an example plot 1300 that shows the resolving power 1310, as a function of f-number of the input light, for a Fabry-Perot interferometer with a spatially varying gap filled with air. The resolving power 1310 is based on the position of the null, as described herein. Usable resolutions in some applications (e.g., on the order of 1%) are available at relatively low f-numbers. Spectral resolutions utilized by many remote sensing systems (e.g., on the order of 100) can be achieved with relatively modest f-numbers of the light collection optical system (e.g., 670). In some embodiments, the f-number of the light collection optical system (e.g., 670) is in the range of approximately 0.5 to 20.

Figure 14:
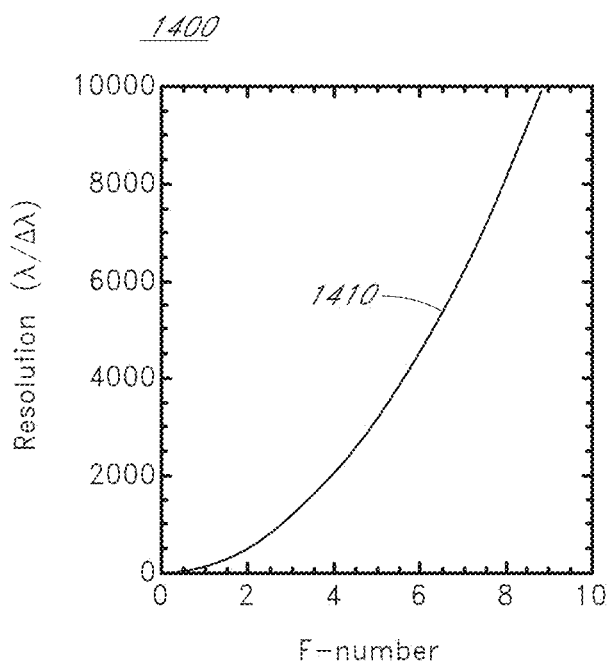
FIG. 14 is an example plot that shows the resolving power, as a function of the effective f-number of the input light, for a germanium Fabry-Perot etalon with a spatially varying gap.

The resolution performance of the Fabry-Perot interferometer with a spatially varying gap may be enhanced, as compared to the air-filled gap, if the gap is filled by a solid, liquid, gel, etc. with a relatively high index of refraction. FIG. 14 is an example plot 1400 that shows the resolving power 1410, as a function of the effective f-number of the input light, for a germanium Fabry-Perot etalon with a spatially varying gap. The high refractive index of germanium has a powerful effect on the achievable resolving power. Of course, other materials besides a germanium could also be used to enhance the resolution of the instrument, as compared to the air-filled gap.

A relatively high index material in the gap of the Fabry-Perot interferometer improves resolution because the angle θ in Equation 1 is the internal angle of light in the interferometer. In a Fabry-Perot etalon (where the gap is filled), the refractive index of the filling medium makes this angle less than the incidence angle, according to Snell's law. Thus, the refractive index of the medium in the gap between the optical surfaces influences the resolution. While high index materials in the gap can be used to achieve relatively high resolutions in theory, in practice, pixel counts of the detector may limit the resolution before the effective f-number of the input beam does. However, Fabry-Perot etalons with a spatially varying gap made of a high index material could still be used, for example, to measure partial interferograms. One such application is the detection of a specific gas with fine spectral structure within a very narrow band.

The peak efficiency (combining the effects of reflectance, sidelobes and variable modulation) near 70% is combined with the impact of the roll-off of amplitude toward the null. This roll-off is estimated to cause another approximately 50% loss, resulting in a final efficiency of approximately 35%. The roll-off is wavelength-dependent as shorter wavelengths may illuminate less than the full array of pixels depending on the F-number and slope S; our estimate of 35% total efficiency assumes placing the null at the full width of the array, for an intermediate wavelength. Longer wavelengths will experience less roll-off attenuation and shorter wavelengths more, proportional to their wavelength. These basic calculations suggest that a useful spatial FTS could be produced from a Fabry Perot interferometer or etalon with variable gap thickness.

Figure 15:
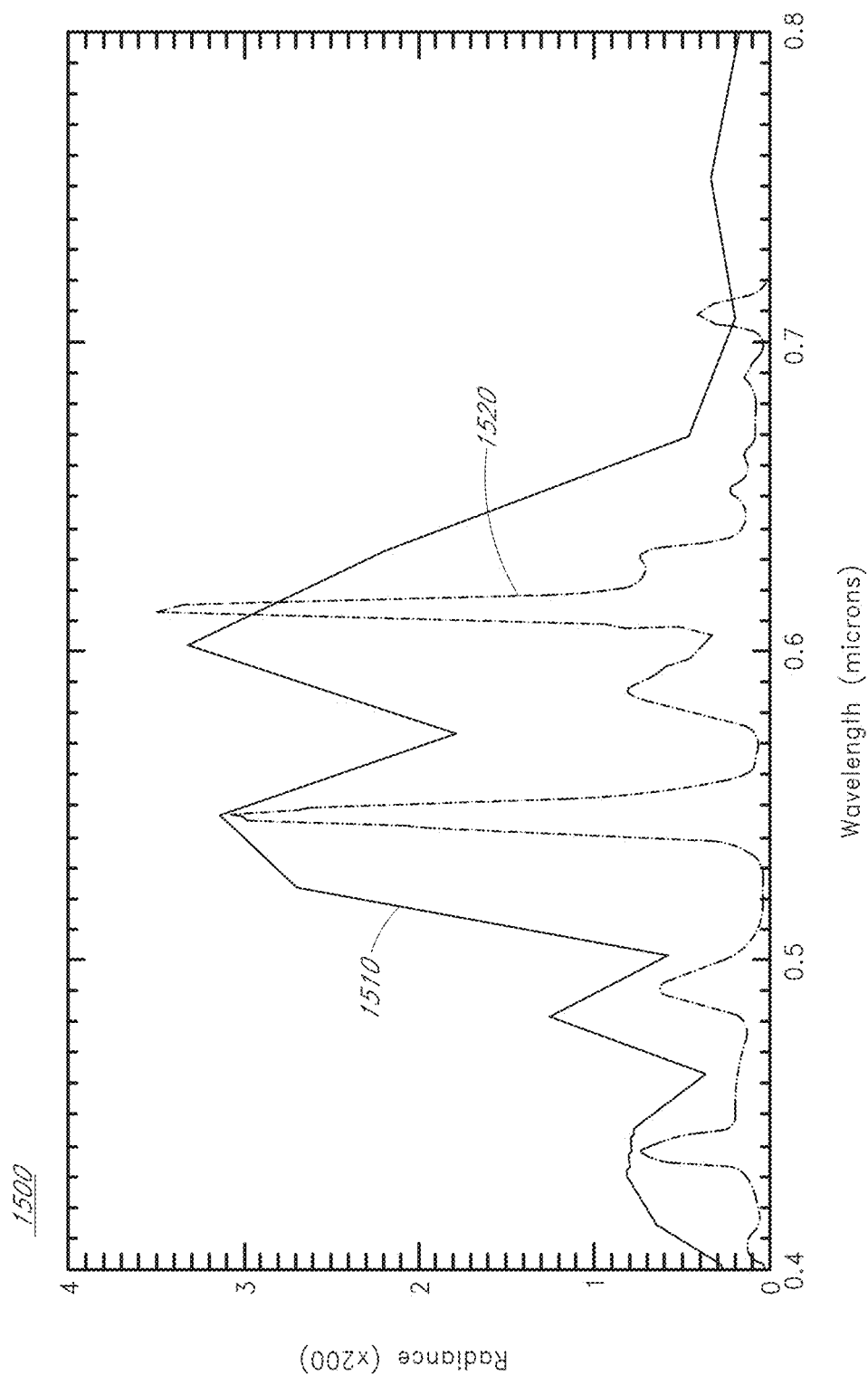
FIG. 15 is an example plot that shows the measured spectrum of fluorescent light using a Fourier transform spectrometer with a Fabry-Perot interferometer that has a spatially varying gap.

FIGS. 15-21 illustrate an experimental set-up of an embodiment of the Fourier transform spectrometer described herein, as well as experimental results obtained using the set-up. In one experiment, the Fourier transform spectrometer was used to measure the spectrum of fluorescent illumination that, while appearing white, is composed of narrow emission lines. FIG. 15 is an example plot 1500 that shows the measured spectrum of fluorescent light using a Fourier transform spectrometer with a Fabry-Perot interferometer that has a spatially varying gap. The plot 1500 in FIG. 15 was generated using the apparatus shown in FIG. 16.

Figure 16:
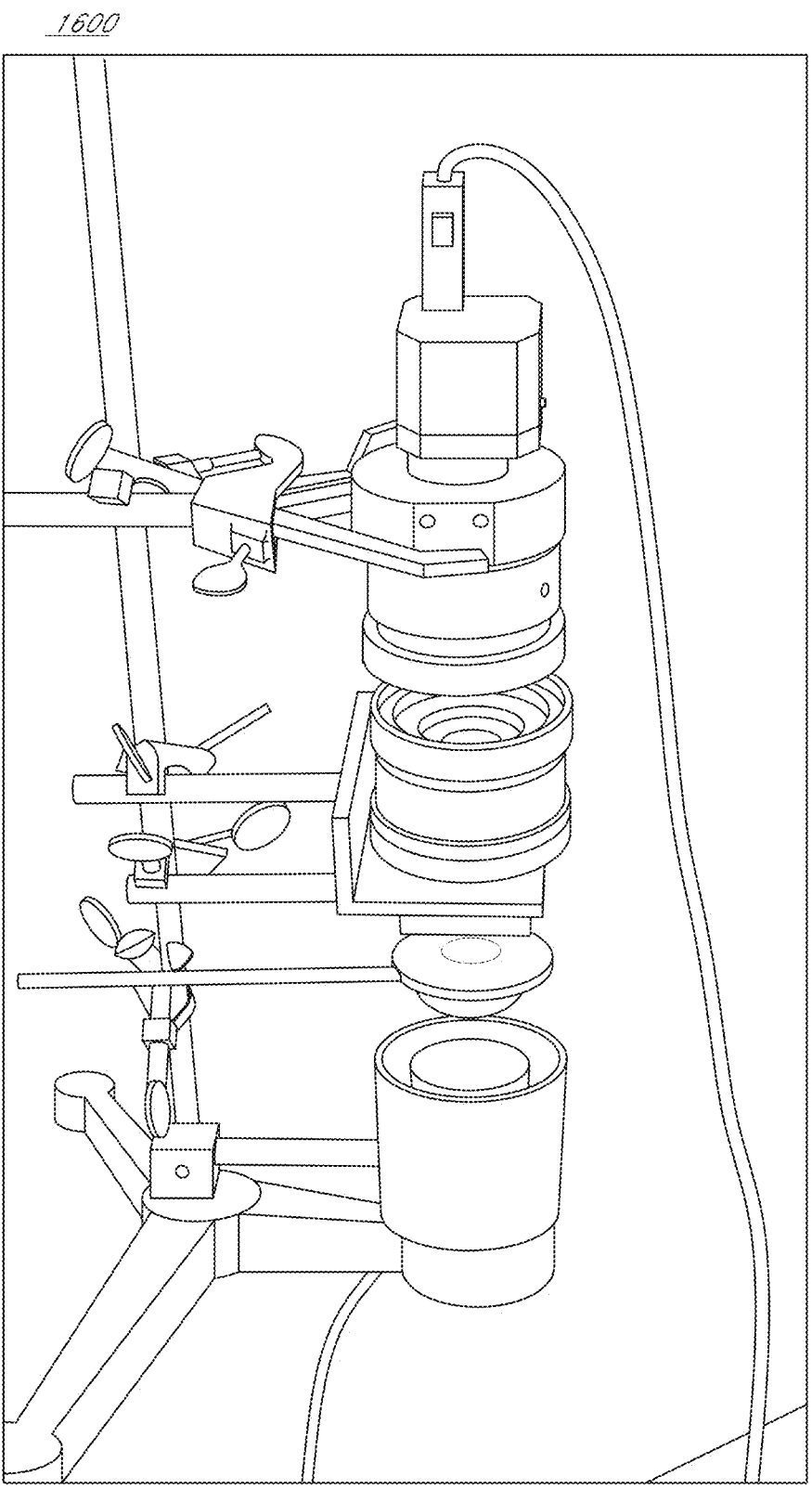
FIG. 16 is a photograph of an embodiment of a Fourier transform spectrometer that uses a Fabry-Perot interferometer with a spatially varying gap.

FIG. 16 is a photograph 1600 of an embodiment of a Fourier transform spectrometer that uses a Fabry-Perot interferometer with a spatially varying gap. Starting from the top, FIG. 16 shows an Infrared camera, IR camera lens, IR relay lens, interferometer, filter, and blackbody source.

The interferometer in FIG. 16 was constructed using a cylindrical lens and a plate, both made of optical glass. The cylindrical lens and plate were brought into optical contact to produce a spatially variable air gap, as illustrated in FIG. 5. The uncoated glass surfaces of the cylindrical lens and plate, which have 4% reflectance, served as the first and second optical surfaces (e.g., 554, 558) of the Fabry-Perot interferometer. The gap separation between the cylindrical lens and the plate was not linear, but the radius of the lens allowed linearization of the fringe pattern. Owing to the relatively low reflectance of the surfaces, the experimental Fabry-Perot interferometer produced modest modulation (about 20%).

With reference to FIG. 15, the Fabry-Perot interferometer of FIG. 16 was used to analyze the spectrum of fluorescent light. The interference pattern created by the Fabry-Perot interferometer was viewed in reflectance rather than transmission, employing a dark background to improve visual contrast. The interference pattern produced by the interferometer was plainly visible, with vivid colors enabled by the fluorescent source that emits narrow spectral lines, and well-separated fringes. Images of the interference pattern were captured. The fringe profiles were extracted, linearized, and then transformed into the spectral domain to produce the spectrum shown in FIG. 13. The dotted line 1520 illustrates the radiance spectrum of the fluorescent source reflected off of a Lambertian surface, as measured by a commercial grating spectrometer. The solid line 1510 illustrates the spectrum that was measured using the experimental version of a Fourier transform spectrometer with a Fabry-Perot interferometer that has a spatially varying gap. Specifically, the solid line 1510 illustrates the Fourier transform of the linearized fringe pattern observed in the interferometer, calibrated with a laser source. While the resolution is relatively low, the spectral lines of the fluorescent source are resolved.

In a second experiment, a 1-m focal length ZnSe cylindrical lens and flat ZnSe plate, both uncoated, were used to produce a Fabry-Perot interferometer with a spatially varying gap. Owing to the relatively higher reflectance of the ZnSe surfaces (approximately 18%), the modulation was on order 50%, and the interference pattern was viewed in transmission. The Fabry-Perot interferometer was imaged onto a commercial microbolometer array camera using a pair of opposing 50 mm f/1.4 IR camera lenses backlit by a 100 degree Celsius flat plate blackbody. The fringe pattern imposed by the blackbody source is shown in FIG. 15.

Figure 17:
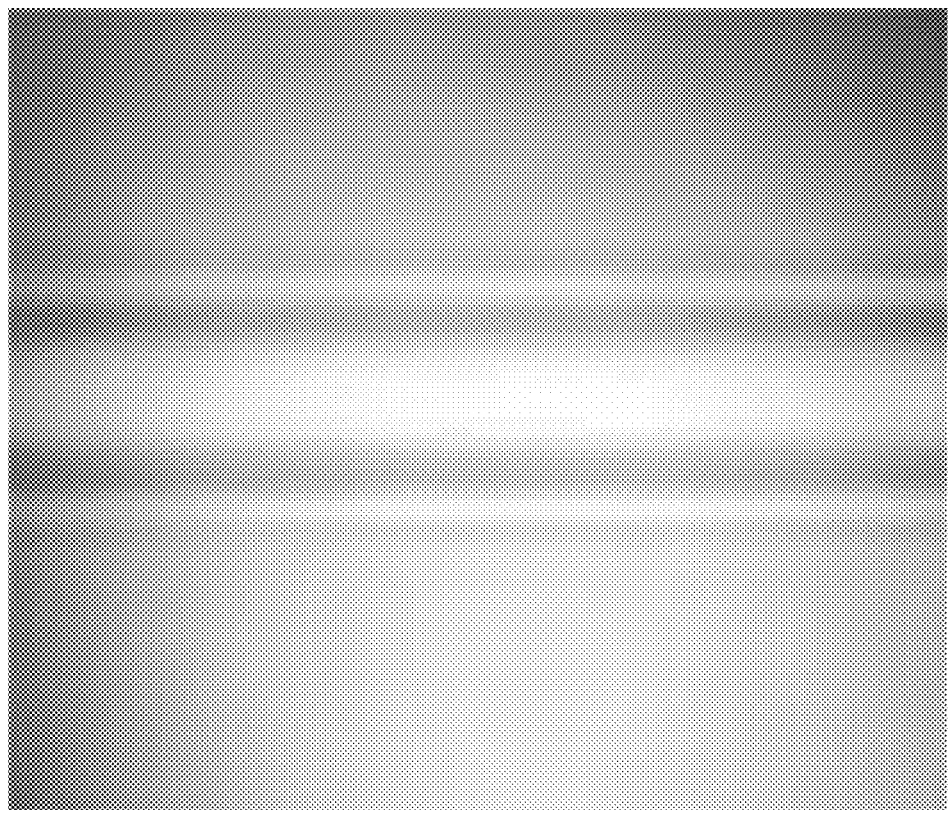
FIG. 17 is an example interference pattern image obtained using the Fourier transform spectrometer of FIG. 16.

FIG. 17 is an example interference pattern image 1700 obtained using the Fourier transform spectrometer of FIG. 16. The broad central fringe is consistent with the nonlinear variation of the gap of the ZnSe Fabry-Perot interferometer transverse to the optical axis. A narrow-band 10.45 micrometer interference filter was placed in the beam to provide wavelength calibration, and to provide data to linearize the fringe pattern. Using these data, the system wavelength response (the combination of the wavelength sensitivity of the camera, principally, and the weak wavelength variations of the interferometer and the camera lenses) was derived.

Figure 18:
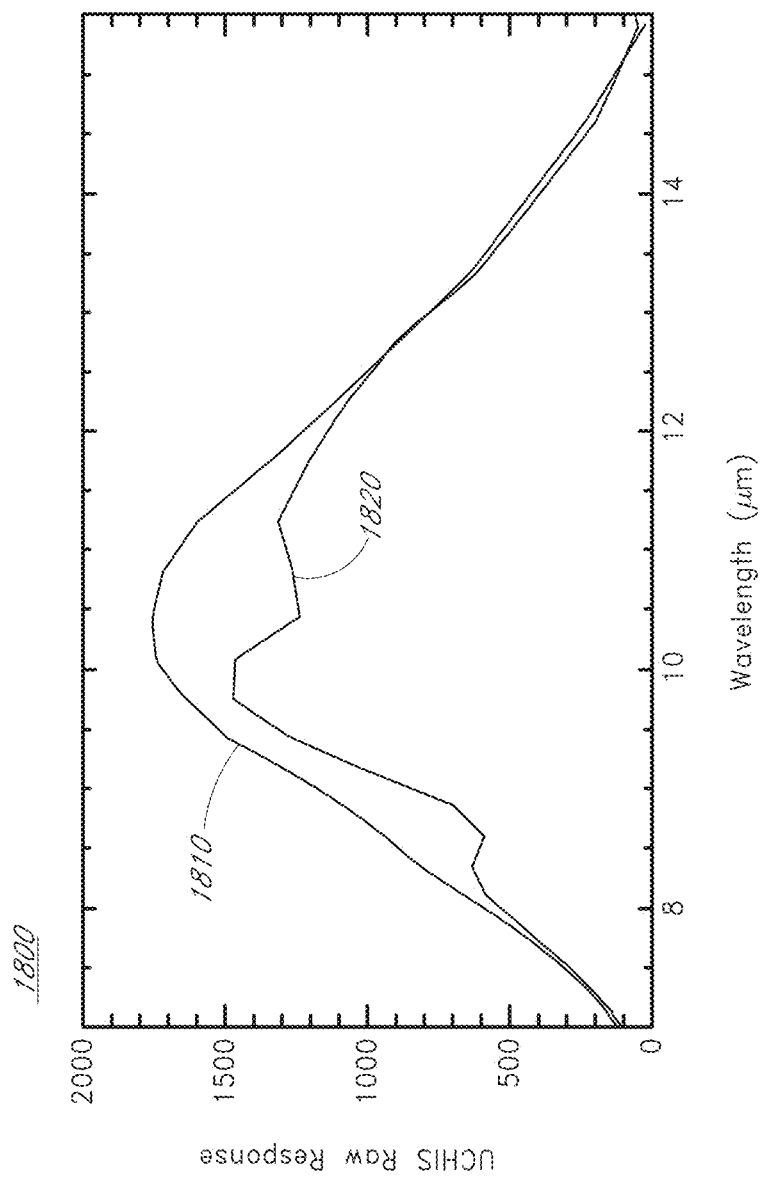
FIG. 18 is an example plot of the measured spectrum of a blackbody source with diethyl ether sprayed into the beam, which was obtained using the Fourier transform spectrometer of FIG. 16.
Figure 19:
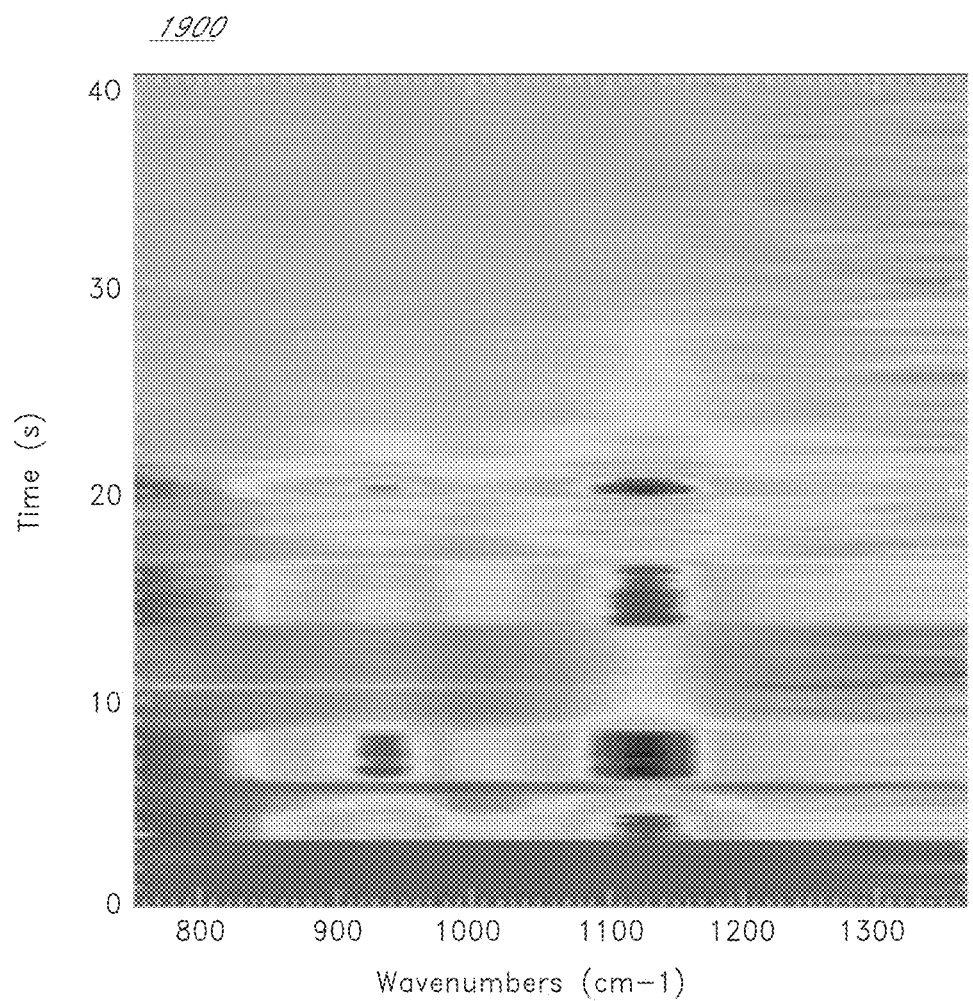
FIG. 19 is an example plot that shows the time variation of the measured spectrum from FIG. 18.

In an additional experiment, the experimental Fabry-Perot interferometer was used to obtain the spectrum of a flowing gas, in this case diethyl ether. FIG. 18 is an example plot 1800 of the measured spectrum of a blackbody source with diethyl ether sprayed into the beam, which was obtained using the Fourier transform spectrometer of FIG. 16. Diethyl ether, as a relatively strong IR absorber, was used to show that the Fabry-Perot interferometer with a spatially varying gap could capture the spectrum of a specific chemical. The curve 1810 represents the measured spectrum of the black body radiation before introducing the diethyl ether gas. While the IR camera was running and collecting interferograms, the gas was introduced into the beam, and the fringe response was immediately apparent, as illustrated by the curve 1820. Using the same procedure used to produce the blackbody spectrum (convolved with camera response), the gas absorption lines are apparent and are superimposed on the blackbody response curve 1810. FIG. 19 is an example plot 1900 that shows the time variation of the measured spectrum from FIG. 18.

In another experiment, a Fabry-Perot interferometer with a linear gap was created. A prism with a relatively shallow included angle (32 mrad) was created from uncoated ZnSe. This prism was brought into contact with a flat ZnSe plate, as illustrated in FIG. 4.

Figure 20:
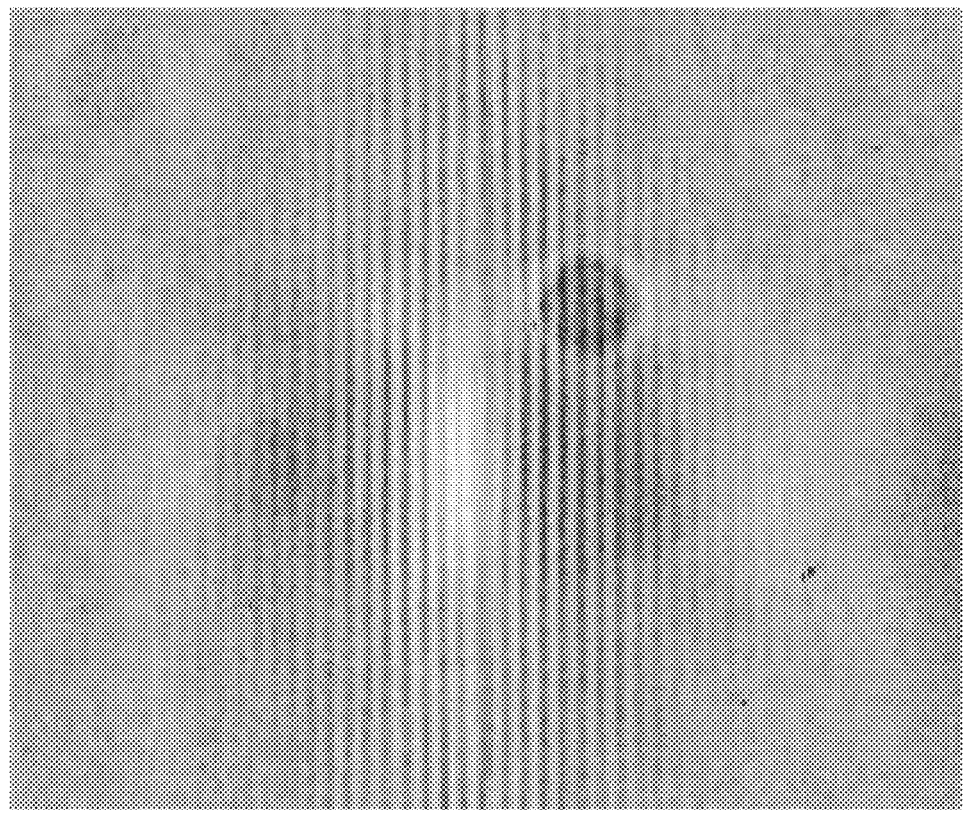
FIG. 20 is an example interference pattern image produced by a Fourier transform spectrometer with a Fabry-Perot interferometer that has a linearly spatially varying gap.

FIG. 20 is an example interference pattern image 2000 produced by a Fourier transform spectrometer with a Fabry-Perot interferometer that has a linearly spatially varying gap. The interference pattern image 2000 shows the response of the prism-plate interferometer to a 10.45 micron, 50 nm wide input. Near the center of the image the fringes are somewhat distorted probably owing to poor optical contact. The fringes display a dropoff in intensity toward the edges of the frame. The gradual loss of fringe visibility away from the center shows the null that results from the range of incidence angles through the interferometer, as discussed herein. The null was consistent with the f/1.4 input beam that was used. The fringe period is linear with position.

Figure 21:
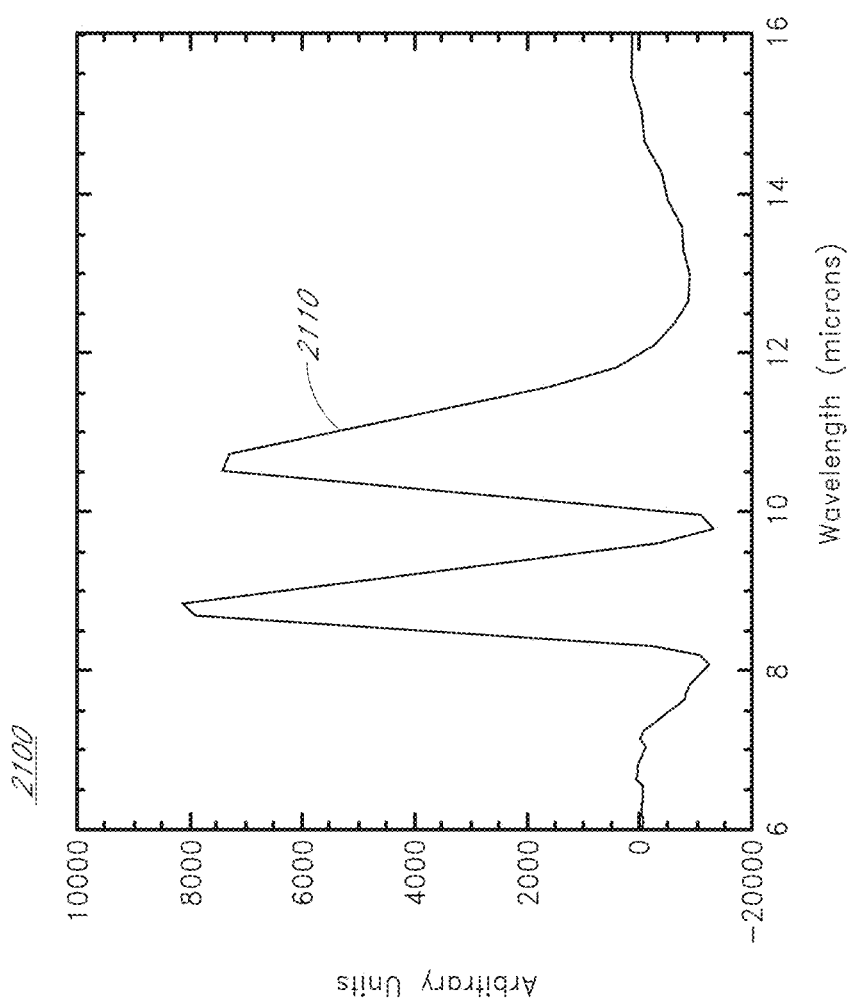
FIG. 21 is an example plot of the measured spectrum of a blackbody source with diethyl ether sprayed into the beam, which was obtained using a Fourier transform spectrometer with a Fabry-Perot interferometer that has a linearly spatially varying gap.

FIG. 21 is an example plot 2100 of the measured spectrum 2110 of a blackbody source with diethyl ether sprayed into the beam, which was obtained using a Fourier transform spectrometer with a Fabry-Perot interferometer that has a linearly spatially varying gap. This experiment was performed similarly to the one illustrated in FIG. 18. However, in this case, the response of the system was plotted as relative absorbance. The data were calibrated in wavelength using a 10.5 micron filter, and non-uniformity in the response was removed using two blackbody temperatures, 25 and 100° C.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently or sequentially.

The processing, or processor, disclosed herein can be implemented using, for example, electronic hardware, computer software, or combinations of both. Whether such functionality is implemented as hardware or software depends upon the particular application and design constraints imposed on the overall system. The described functionality can be implemented in varying ways for each particular application. In the case of software, a software module can reside in RAM memory, flash memory, ROM memory, EPROM memory, EEPROM memory, registers, a hard disk, a removable disk, a CD-ROM, or any other form of computer-readable storage medium known in the art. A storage medium can be coupled to a processor such that the processor can read information from, and write information to, the storage medium. In the case of hardware, the processor can be implemented as a single processor computer chip, multiple computer chips, an ASIC, an FPGA, discrete components, or any other suitable processing device or equipment. In addition, the processor may be directly or remotely communicatively coupled (e.g., via a network such as the Internet or a LAN) to the information source. The processor may also include a distributed computing cluster or grid.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A Fourier transform spectrometer, comprising:
   a Fabry-Perot interferometer to create a spatial interference pattern using input light;
   a detector positioned with respect to the Fabry-Perot interferometer to capture an image of the spatial interference pattern to produce an interferogram, the detector comprising a plurality of detection elements, and defining an optical axis that is orthogonal to the detector; and
   a processor that is communicatively coupled to the detector, the processor being configured to process the interferogram to determine information about the spectral content of the light,
   wherein the Fabry-Perot interferometer comprises first and second optical surfaces that are partially transmissive and partially reflective to the light, the first and second optical surfaces defining a resonant cavity therebetween, the distance between the first and second optical surfaces being spatially variable in a first transverse direction that is orthogonal to the optical axis, and
   wherein the first and second optical surfaces are configured such that the interferogram is symmetric.

2. The Fourier transform spectrometer of claim 1, wherein the first and second optical surfaces are fixed with respect to one another.

3. The Fourier transform spectrometer of claim 1, wherein the first and second optical surfaces have a smoothly varying slope in the first transverse direction.

4. The Fourier transform spectrometer of claim 1, wherein the distance between the first and second optical surfaces is variable in a second transverse direction that is orthogonal to the optical axis and to the first transverse direction.

5. The Fourier transform spectrometer of claim 1, wherein the distance between the first and second optical surfaces varies substantially linearly in the first transverse direction for at least a portion of the resonant cavity.

6. The Fourier transform spectrometer of claim 1, wherein at least one of the first and second optical surfaces is substantially planar.

7. The Fourier transform spectrometer of claim 1, wherein at least one of the first and second optical surfaces comprises two or more portions joined together at an angle.

8. The Fourier transform spectrometer of claim 1, wherein at least one of the first and second optical surfaces comprises a prism, the prism comprising at least first and second substantially planar portions that join at a vertex region.

9. The Fourier transform spectrometer of claim 1, wherein at least one of the first and second optical surfaces comprises a surface of a lens.

10. The Fourier transform spectrometer of claim 9, wherein the lens is a cylindrical lens.

11. The Fourier transform spectrometer of claim 1, wherein the distance between the first and second optical surfaces has a relative minimum in a central region of the Fabry-Perot interferometer.

12. The Fourier transform spectrometer of claim 1, wherein the distance between the first and second optical surfaces has a relative minimum at a peripheral region of the Fabry-Perot interferometer.

13. The Fourier transform spectrometer of claim 1, wherein the first and second optical surfaces are in physical contact with one another at one or more physical contact points.

14. The Fourier transform spectrometer of claim 1, wherein the first and second optical surfaces are in optical contact with one another at one or more optical contact points where the optical distance between the first and second optical surfaces is substantially zero.

15. The Fourier transform spectrometer of claim 1, wherein the region between the first and second optical surfaces comprises a vacuum, gas, or liquid.

16. The Fourier transform spectrometer of claim 1, wherein the region between the first and second optical surfaces comprises a solid material.

17. The Fourier transform spectrometer of claim 1, wherein the first and second optical surfaces have a reflectance in the range of about 20-60%.

18. The Fourier transform spectrometer of claim 1, wherein the first and second optical surfaces have a reflectance of about 40%.

19. The Fourier transform spectrometer of claim 1, further comprising an optical system to relay the interference pattern from the Fabry-Perot interferometer to the detector.

20. The Fourier transform spectrometer of claim 1, wherein at least one of the first and second optical surfaces is movable.

21. The Fourier transform spectrometer of claim 20, wherein at least one of the first and second optical surfaces is movable with respect to the other.

22. The Fourier transform spectrometer of claim 21, wherein at least one of the first and second optical surfaces is movable with respect to the detector.

23. The Fourier transform spectrometer of claim 21, wherein at least one of the first and second optical surfaces can be tilted with respect to the other.

24. A method of determining the spectral content of input light, the method comprising:
creating a spatial interference pattern from input light using a Fabry-Perot interferometer;
creating an interference pattern image using a detector that is positioned with respect to the Fabry-Perot interferometer to capture an image of the spatial interference pattern to produce an interferogram, the detector comprising a plurality of detection elements, and defining an optical axis that is orthogonal to the detector; and
processing the interferogram using a processor to determine information about the spectral content of the light,
wherein the Fabry-Perot interferometer comprising first and second optical surfaces that are partially transmissive and partially reflective to the light, the first and second optical surfaces defining a resonant cavity therebetween, the distance between the first and second optical surfaces being spatially variable in a first transverse direction that is orthogonal to the optical axis,
wherein the first and second optical surfaces are configured such that the interferogram is symmetric, and
wherein the interferogram is captured during a period of time in which characteristics of the Fabry-Perot interferometer are not intentionally varied.

* * * * *